(12) United States Patent
Yagami

(10) Patent No.: US 12,267,609 B2
(45) Date of Patent: Apr. 1, 2025

(54) SOLID-STATE IMAGING DEVICE

(71) Applicant: Sony Semiconductor Solutions Corporation, Kanagawa (JP)

(72) Inventor: Takanori Yagami, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 105 days.

(21) Appl. No.: 18/247,544

(22) PCT Filed: Sep. 30, 2021

(86) PCT No.: PCT/JP2021/036233
§ 371 (c)(1),
(2) Date: Mar. 31, 2023

(87) PCT Pub. No.: WO2022/075190
PCT Pub. Date: Apr. 14, 2022

(65) Prior Publication Data
US 2023/0379600 A1  Nov. 23, 2023

(30) Foreign Application Priority Data
Oct. 8, 2020  (JP) ................................. 2020-170655

(51) Int. Cl.
  *H04N 25/77* (2023.01)
  *H04N 25/709* (2023.01)
  *H04N 25/76* (2023.01)
  *H04N 25/79* (2023.01)

(52) U.S. Cl.
  CPC .......... *H04N 25/77* (2023.01); *H04N 25/709* (2023.01); *H04N 25/7795* (2023.01); *H04N 25/79* (2023.01)

(58) Field of Classification Search
  CPC .. H04N 25/77; H04N 25/709; H04N 25/7795; H04N 25/79; H04N 25/76; H04N 25/772
  See application file for complete search history.

(56) References Cited

U.S. PATENT DOCUMENTS 9,992,435 B2 *  6/2018  Kwag ................... H04N 25/629
10,205,897 B2 *  2/2019  Kim ..................... H04N 25/626
(Continued)

FOREIGN PATENT DOCUMENTS

| JP | 2008271280 A | 11/2008 |
|---|---|---|
| WO | 2016136448 A1 | 9/2016 |
| WO | 2018030137 A1 | 2/2018 |

OTHER PUBLICATIONS

International Search Report (PCT/ISA/210), International Application No. PCT/JP2021/036233, dated Dec. 14, 2021.

*Primary Examiner* — Marly S Camargo
(74) *Attorney, Agent, or Firm* — Michael Best & Friedrich LLP

(57) ABSTRACT

A voltage drop of a floating diffusion capacitor is suppressed.
A solid-state imaging device includes a floating diffusion that accumulates charge generated by photoelectric conversion according to an amount of received light of a pixel, a comparison circuit that compares a voltage corresponding to accumulated charge of the floating diffusion with a reference voltage, and a boosting unit that raises a potential on one end side of the floating diffusion during photoelectric conversion.

16 Claims, 21 Drawing Sheets

(56) References Cited

U.S. PATENT DOCUMENTS

| | | | |
|---|---|---|---|
| 2007/0147132 A1* | 6/2007 | Lee | H04N 25/626 |
| | | | 365/185.23 |
| 2017/0272678 A1* | 9/2017 | Sakakibara | H04N 25/77 |
| 2018/0013412 A1* | 1/2018 | Kikuchi | H04N 25/79 |
| 2019/0222781 A1* | 7/2019 | Lim | H04N 25/618 |
| 2019/0280025 A1* | 9/2019 | Sakakibara | H04N 25/709 |
| 2021/0029316 A1* | 1/2021 | Lee | H04N 25/709 |
| 2022/0141411 A1* | 5/2022 | Sato | H04N 25/77 |

* cited by examiner

SOLID-STATE IMAGING DEVICE

TECHNICAL FIELD

Embodiments according to the present disclosure relate to a solid-state imaging device.

BACKGROUND ART

As a solid-state imaging device, for example, there is a complementary MOS (CMOS) image sensor that reads out photocharge accumulated in a pn junction capacitor of a photodiode that is a photoelectric conversion element via a metal oxide semiconductor (MOS) transistor. In the CMOS image sensor, for example, a read operation of the photocharge accumulated in the photodiode is executed for each pixel or each row, or the like. Thus, an exposure period during which the photocharge is accumulated cannot be matched in all pixels, and a distortion occurs at the time of imaging in a case where the subject is moving, or the like. As a method of suppressing this distortion, it is known that an analog-to-digital converter is arranged for each pixel, and respective analog signals exposed simultaneously in all pixels are digitally converted immediately.

Furthermore, in order to downsize the imaging device and improve the aperture ratio of pixels, an imaging device in which a pixel substrate on which pixels are arranged and a logic substrate (logic circuit substrate) on which a peripheral circuit is arranged are stacked is used. For example, there has been proposed an imaging device in which a pixel substrate on which pixels are arranged in a two-dimensional lattice pattern and which outputs an analog image signal and a logic substrate which processes the output analog image signal are stacked (see Patent Document 1).

CITATION LIST

Patent Document

Patent Document 1: WO 2016/136448

SUMMARY OF THE INVENTION

Problems to be Solved by the Invention

However, in the above-described technology, the analog-to-digital converters are arranged in a two-dimensional lattice pattern on the logic substrate, and the analog image signal output from the pixel substrate is input to the analog-to-digital converters of the logic substrate. In this case, a voltage VDD supplied from the logic substrate passes through a comparator of the analog-to-digital converter, so that a voltage drop occurs. When the voltage drop occurs, the voltage input to a floating diffusion capacitor decreases, which causes noise due to the voltage relationship between the floating diffusion capacitor and the transfer transistor.

Therefore, the present disclosure provides a solid-state imaging device capable of suppressing a voltage drop of the floating diffusion capacitor.

Solutions to Problems

In order to solve the above-described problem, according to the present disclosure,
there is provided a solid-state imaging device including:
a floating diffusion that accumulates charge generated by photoelectric conversion according to an amount of received light of a pixel;
a comparison circuit that compares a voltage corresponding to accumulated charge of the floating diffusion with a reference voltage; and
a boosting unit that raises a potential on one end side of the floating diffusion during photoelectric conversion.

The boosting unit may include a first transistor that controls a current flowing through the comparison circuit in such a manner that a potential on one end side of the floating diffusion becomes high.

A current source that generates a current flowing through the comparison circuit may be further included, in which the first transistor may control a current generated by the current source.

A second transistor cascode-connected to the first transistor may be further included, in which the current source may control a current flowing through the comparison circuit according to a current flowing through the second transistor.

A current flowing through the second transistor may be controlled by a gate voltage of the first transistor.

The current source may include a third transistor that causes a current to flow in the comparison circuit, and
a gate of the third transistor may be connected to a gate of the second transistor.

A gate voltage of the third transistor may be raised when the first transistor is turned on.

A gate of the third transistor may be capacitively coupled to the floating diffusion.

There may be further included:
a first chip on which a pixel circuit having the floating diffusion is arranged; and
a second chip stacked on the first chip and in which at least a part of the boosting unit including the first transistor is arranged.

The current source may include a third transistor that causes a current to flow in the comparison circuit, and
the first transistor may be cascode-connected to the third transistor.

The comparison circuit may include a differential transistor pair that outputs a signal corresponding to a differential voltage between a voltage corresponding to the accumulated charge of the floating diffusion and the reference voltage, and
the first transistor may be connected between the differential transistor pair and the third transistor.

The comparison circuit may include a differential transistor pair that outputs a signal corresponding to a differential voltage between a voltage corresponding to the accumulated charge of the floating diffusion and the reference voltage, and
the third transistor may be connected between the differential transistor pair and the first transistor.

The first transistor and the third transistor may be shared by a plurality of pixels each having the floating diffusion.

The first transistor and the third transistor may be arranged in a chip on which a pixel circuit having the floating diffusion is arranged.

The first transistor and the third transistor may be arranged in a pixel region of one pixel among the plurality of pixels.

The boosting unit may raise a potential on one end side of the floating diffusion using capacitive coupling.

A current source that generates a current flowing through the comparison circuit may be further included, in which the boosting unit may raise a potential on one end side of the floating diffusion by capacitive coupling between a gate wiring of a transistor constituting the current source and the floating diffusion.

There may be further included:

a time code generator that generates a time code;

a time code transfer unit that transfers the time code generated by the time code generator;

a reference voltage generator that generates the reference voltage whose voltage level changes according to time; and a time code holding unit that is provided for each pixel and holds the time code when the voltage corresponding to the accumulated charge of the floating diffusion and the reference voltage match as a digital signal corresponding to the amount of received light.

The time code generator, the time code transfer unit, the reference voltage generator, and the time code holding unit may be arranged on a chip different from a chip on which a pixel circuit having the floating diffusion is arranged.

MODE FOR CARRYING OUT THE INVENTION

Figure 1:
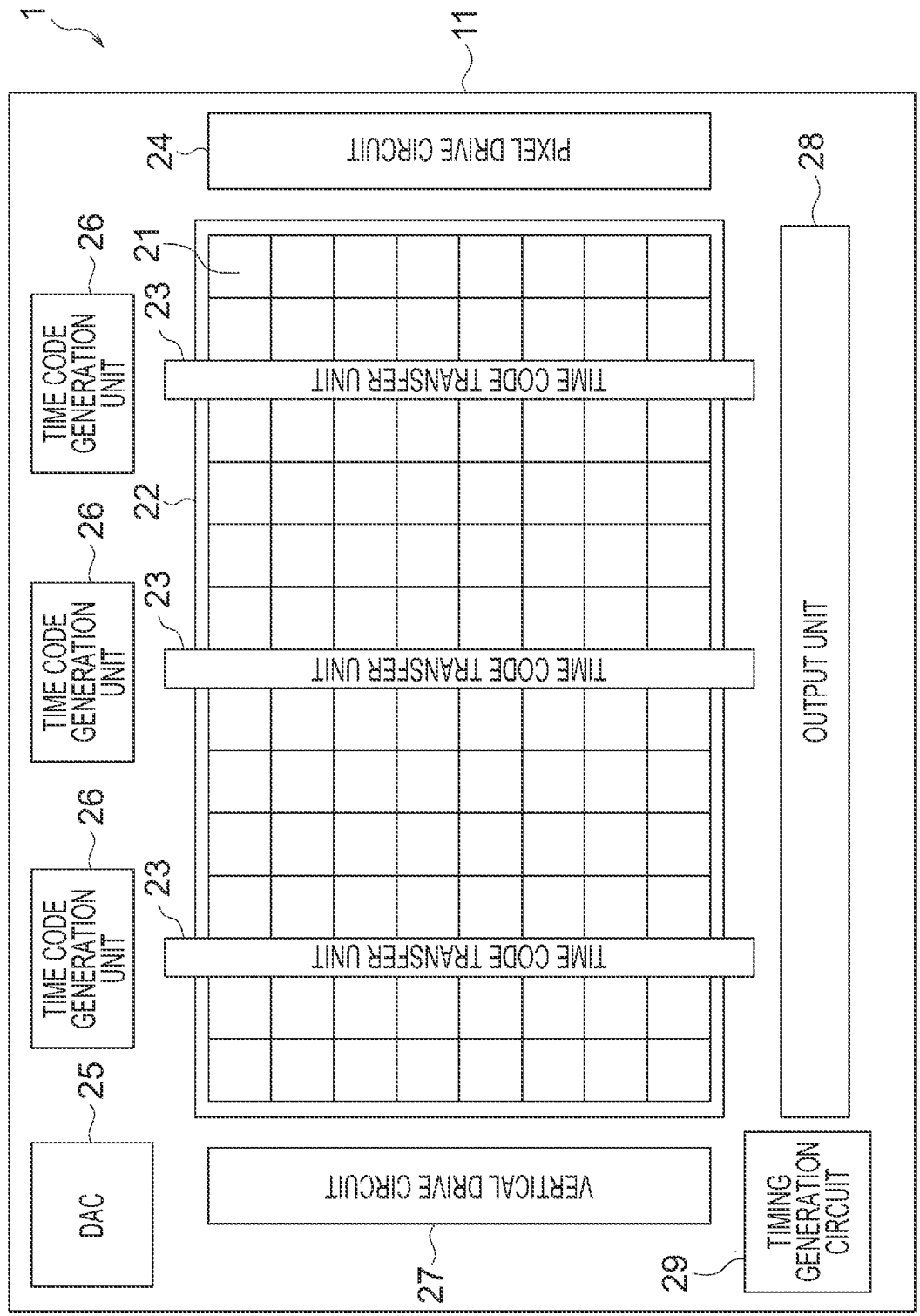
FIG. 1 is a schematic configuration of a solid-state imaging device according to the present disclosure.

Hereinafter, embodiments of a solid-state imaging device will be described with reference to the drawings. Although main components of the solid-state imaging device will be mainly described below, the solid-state imaging device may have components and functions that are not illustrated or described. The following description does not exclude components and functions that are not illustrated or described.

The drawings are schematic or conceptual, and the ratio of each portion and the like are not necessarily the same as actual ones. In the description and the drawings, elements similar to those described above with respect to previously described drawings are denoted by the same reference numerals, and detailed descriptions thereof are appropriately omitted.

<Schematic Configuration Example of Solid-State Imaging Device>

FIG. 1 illustrates a schematic configuration of a solid-state imaging device according to the present disclosure.

The solid-state imaging device 1 of FIG. 1 includes a pixel array unit 22 in which pixels 21 are arranged in a two-dimensional array on a semiconductor substrate 11 using, for example, silicon (Si) as a semiconductor. The pixel array unit 22 is also provided with time code transfer units 23 that each transfer the time code generated by a time code generation unit 26 to each pixel 21. Then, a pixel drive circuit 24, a D/A converter (DAC) 25, the time code generation unit 26, a vertical drive circuit 27, an output unit 28, and a timing generation circuit 29 are formed around the pixel array unit 22 on the semiconductor substrate 11.

As will be described later with reference to FIG. 2, each of the pixels 21 arranged in a two-dimensional array is provided with a pixel circuit 41 and an ADC 42, and the pixel 21 generates a charge signal corresponding to the amount of light received by a light receiving element (for example, a photodiode) in the pixel, converts the charge signal into a digital pixel signal SIG, and outputs the digital pixel signal SIG.

The pixel drive circuit 24 drives the pixel circuit 41 (FIG. 2) in the pixel 21. The DAC 25 generates a reference signal (reference voltage signal) REF, which is a slope signal whose level (voltage) monotonously decreases with the lapse of time, and supplies the reference signal REF to each pixel 21. The time code generation unit 26 generates a time code used when each pixel 21 converts an analog pixel signal SIG into a digital signal (AD conversion), and supplies the time code to the corresponding time code transfer unit 23. A plurality of time code generation units 26 is provided for the pixel array unit 22, and in the pixel array unit 22, the time code transfer units 23 are provided as many as the number of time code generation units 26. That is, the time code generation units 26 and the time code transfer units 23 that transfer the time code generated therein correspond to each other on a one-to-one basis.

The vertical drive circuit 27 performs control to cause the output unit 28 to output the digital pixel signal SIG generated in the pixel 21 in a predetermined order on the basis of a timing signal supplied from the timing generation circuit 29. The digital pixel signal SIG output from the pixel 21 is output from the output unit 28 to the outside of the solid-state imaging device 1. The output unit 28 performs predetermined digital signal processing such as black level correction processing for correcting a black level and correlated double sampling (CDS) processing as necessary, and thereafter performs output to the outside.

The timing generation circuit 29 includes a timing generator that generates various timing signals and the like, and supplies the generated various timing signals to the pixel drive circuit 24, the DAC 25, the vertical drive circuit 27, and the like.

The solid-state imaging device 1 is configured as described above. Note that, in FIG. 1, as described above, it has been described that all the circuits constituting the solid-state imaging device 1 are formed on one semiconductor substrate 11, but as will be described later, the circuits constituting the solid-state imaging device 1 may be divided and arranged on a plurality of semiconductor substrates 11.

<Detailed Configuration Example of Pixel>

Figure 2:
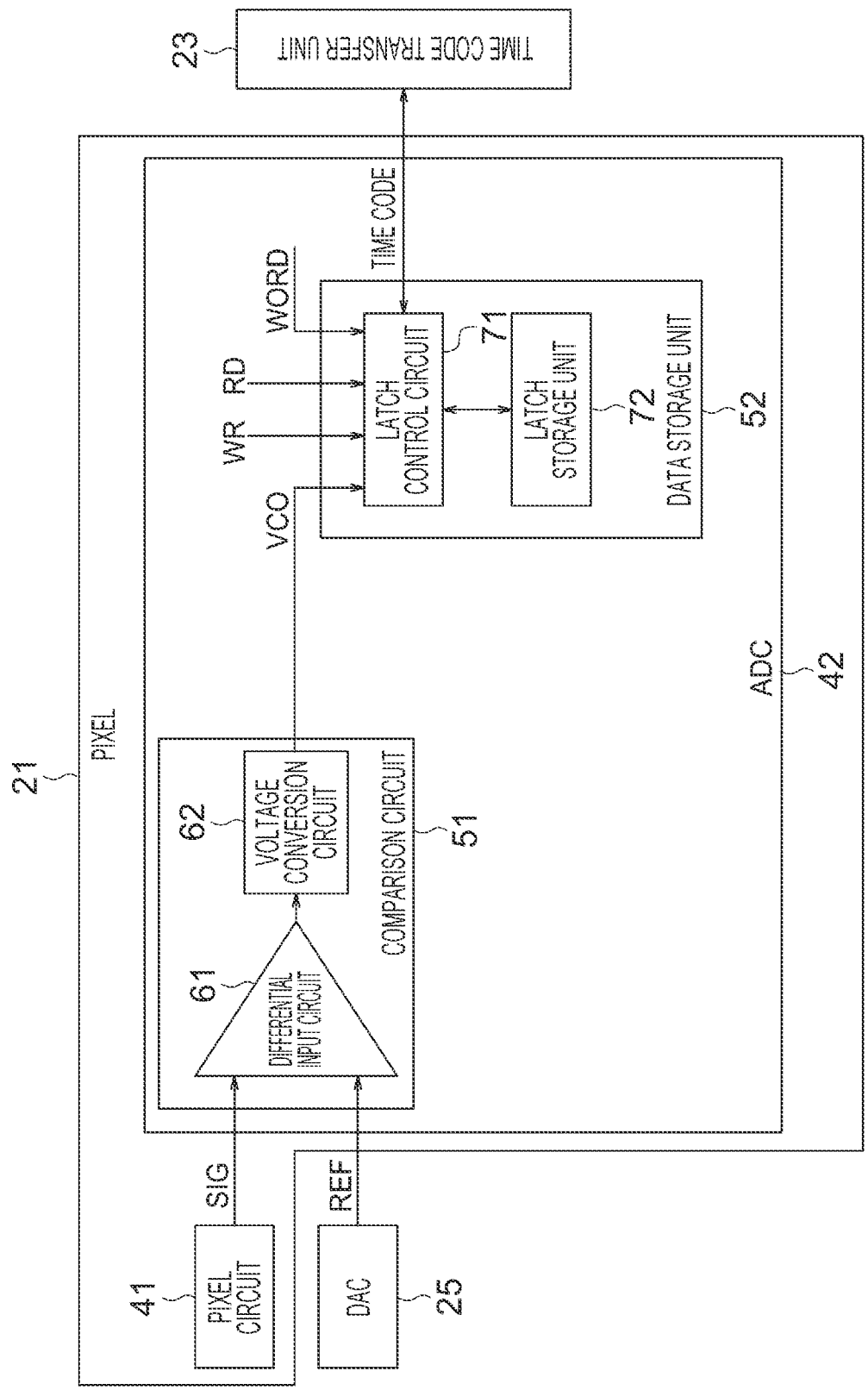
FIG. 2 is a block diagram illustrating a detailed configuration example of a pixel.

FIG. 2 is a block diagram illustrating a detailed configuration example of the pixel 21.

The pixel 21 includes the pixel circuit 41 and the AD converter (ADC) 42.

The pixel circuit 41 outputs a charge signal corresponding to the amount of received light to the ADC 42 as the analog pixel signal SIG. The ADC 42 converts the analog pixel signal SIG supplied from the pixel circuit 41 into a digital signal.

The ADC 42 includes a comparison circuit 51 and a data storage unit 52.

The comparison circuit 51 compares the reference signal REF supplied from the DAC 25 with the pixel signal SIG, and outputs an output signal VCO as a comparison result signal indicating a comparison result. The comparison circuit 51 inverts the output signal VCO when the reference signal REF and the pixel signal SIG become the same (the same voltage).

The comparison circuit 51 includes a differential input circuit 61 and a voltage conversion circuit 62, which will be described later in detail with reference to FIG. 3.

In addition to the input of the output signal VCO from the comparison circuit 51 to the data storage unit 52, from the vertical drive circuit 27, a WR signal indicating that it is a pixel signal write operation, an RD signal indicating that it is a pixel signal read operation, and a WORD signal for controlling a read timing of the pixel 21 during the pixel signal read operation are supplied from the vertical drive circuit 27. Furthermore, the time code generated by the time code generation unit 26 is also supplied via the time code transfer unit 23.

The data storage unit 52 includes a latch control circuit 71 that controls a write operation and a read operation of the time code on the basis of the WR signal and the RD signal, and a latch storage unit 72 that stores the time code.

In the write operation of the time code, the latch control circuit 71 stores the time code, which is supplied from the time code transfer unit 23 and updated every unit time, in the latch storage unit 72 while a Hi (High) output signal VCO is input from the comparison circuit 51. Then, when the reference signal REF and the pixel signal SIG become the same (voltage thereof) and the output signal VCO supplied from the comparison circuit 51 is inverted to Lo (Low), writing (updating) of the supplied time code is stopped, and the time code finally stored in the latch storage unit 72 is held in the latch storage unit 72. The time code stored in the latch storage unit 72 indicates a time at which the pixel signal SIG and the reference signal REF become equal, and represents data indicating that the pixel signal SIG has been the reference voltage at that time, that is, a digitized light amount value.

After a sweep of the reference signal REF is completed and the time codes are stored in the latch storage units 72 of all the pixels 21 in the pixel array unit 22, the operation of the pixels 21 is changed from the write operation to the read operation.

In the time code read operation, the latch control circuit 71 outputs the time code (digital pixel signal SIG) stored in the latch storage unit 72 to the time code transfer unit 23 when the pixel 21 reaches its own read timing on the basis of the WORD signal for controlling the read timing. The time code transfer unit 23 sequentially transfers the supplied time code in the column direction (vertical direction) and supplies the time code to the output unit 28.

Hereinafter, in order to distinguish from the time code written in the latch storage unit 72 in the write operation of the time code, digitized pixel data indicating that the pixel signal SIG has been the reference voltage at that time, which is inverted time code when the output signal VCO read from the latch storage unit 72 in the time code read operation is inverted, is also referred to as AD converted pixel data.

<Configuration Example of Comparison Circuit>

Figure 3:
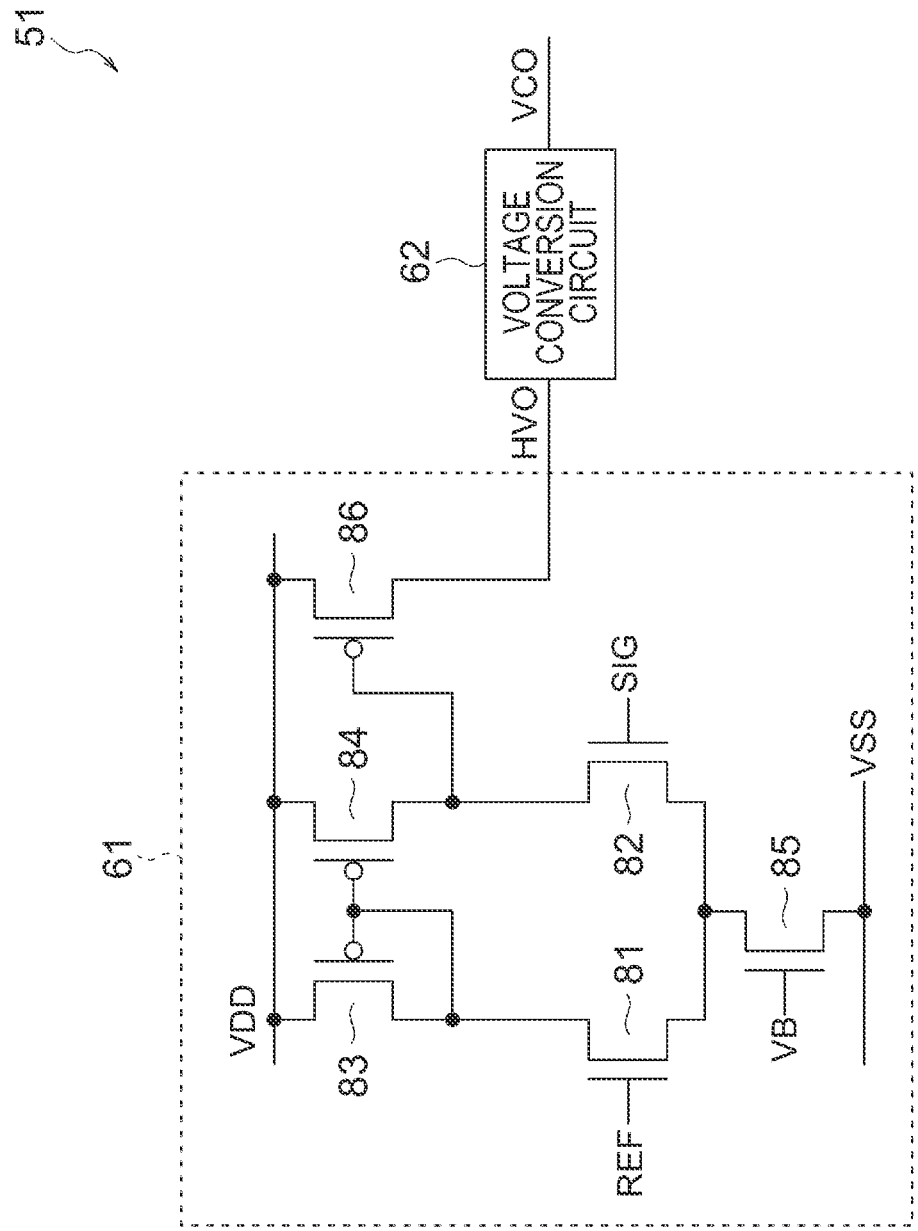
FIG. 3 is a circuit diagram illustrating a detailed configuration of a differential input circuit constituting a comparison circuit.

FIG. 3 is a circuit diagram illustrating detailed configurations of the differential input circuit 61 and the voltage conversion circuit 62 constituting the comparison circuit 51.

The differential input circuit 61 compares the pixel signal SIG output from the pixel circuit 41 in the pixel 21 with the reference signal REF output from the DAC 25, and outputs a predetermined signal (current) when the pixel signal SIG is higher than the reference signal REF.

The differential input circuit 61 includes transistors 81 and 82 forming a differential pair, transistors 83 and 84 constituting a current mirror, a transistor 85 as a constant current source that supplies a current IB according to an input bias current VB, and a transistor 86 that outputs an output signal HVO of the differential input circuit 61.

The transistors 81, 82, and 85 include negative channel MOS (NOS) transistors, and the transistors 83, 84, and 86 include positive channel MOS (PMOS) transistors.

In the transistors 81 and 82 forming a differential pair, the reference signal REF output from the DAC 25 is input to a gate of the transistor 81, and the pixel signal SIG output from the pixel circuit 41 in the pixel 21 is input to a gate of the transistor 82. Sources of the transistors 81 and 82 are connected to a drain of the transistor 85, and a source of the transistor 85 is connected to a predetermined voltage VSS (VSS<VDD).

A drain of the transistor 81 is connected to gates of the transistors 83 and 84 and a drain of the transistor 83 constituting the current mirror circuit, and a drain of the transistor 82 is connected to a drain of the transistor 84 and a gate of the transistor 86. Sources of the transistors 83, 84, and 86 are connected to a first power supply voltage VDD.

The transistors 81 to 86 constituting the differential input circuit 61 are circuits operating at high voltages up to the first power supply voltage VDD.

The voltage conversion circuit 62 adjusts a level difference between an analog region and a digital region. The voltage conversion circuit 62 converts the output signal HVO input from the differential input circuit 61 into an output signal VCO with an adjusted level difference, and outputs the output signal VCO to the data storage unit 52. The output signal VCO is a voltage corresponding to the gradation.

<Detailed Configuration Example of Pixel Circuit>

A detailed configuration of the pixel circuit 41 will be described with reference to FIG. 4.

Figure 4:
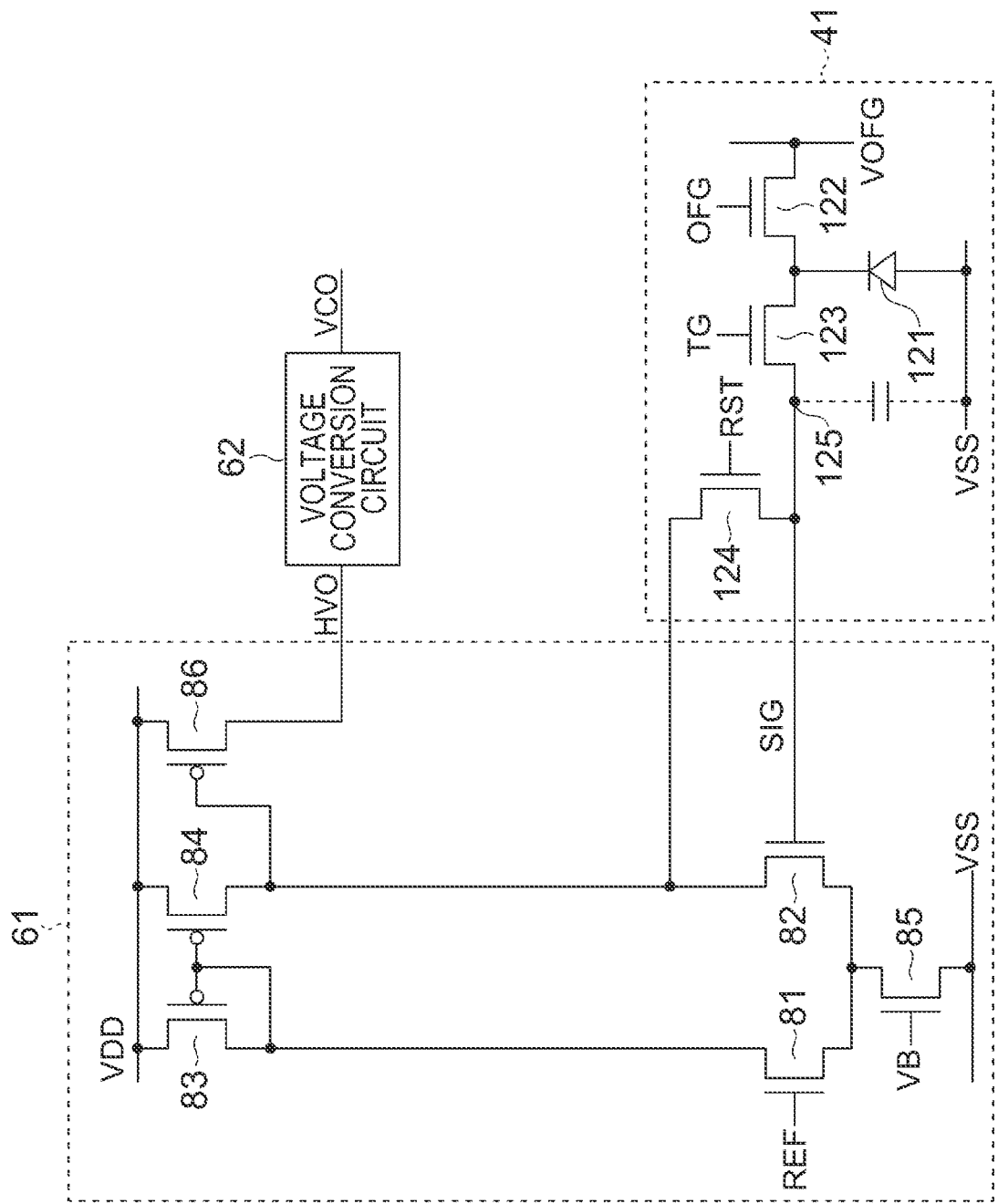
FIG. 4 is a circuit diagram in which details of a pixel circuit are added to the comparison circuit illustrated in FIG. 3.

FIG. 4 is a circuit diagram in which details of the pixel circuit 41 are added to the comparison circuit 51 illustrated in FIG. 3.

The pixel circuit 41 includes a photodiode (PD) 121 as a photoelectric conversion element, a discharge transistor 122, a transfer transistor 123, a reset transistor 124, and a floating diffusion layer (FD) 125.

The discharge transistor 122 is used in a case of adjusting the exposure period. Specifically, if the discharge transistor 122 is turned on when it is desired to start the exposure period at an arbitrary timing, charge accumulated in the photodiode 121 until then are discharged, and thus the exposure period is started after the discharge transistor 122 is turned off.

The transfer transistor 123 transfers the charge generated by the photodiode 121 to the FD 125. The reset transistor 124 resets the charge held in the FD 125. The FD 125 is connected to the gate of the transistor 82 of the differential input circuit 61. Thus, the transistor 82 of the differential input circuit 61 also functions as an amplification transistor of the pixel circuit 41.

A source of the reset transistor 124 is connected to the gate of the transistor 82 of the differential input circuit 61 and the FD 125, and a drain of the reset transistor 124 is connected to the drain of the transistor 82. Therefore, there is no fixed reset voltage for resetting the charge of the FD 125. This is because the reset voltage for resetting the FD 125 can be arbitrarily set using the reference signal REF by controlling the circuit state of the differential input circuit 61.

<Plural-Substrate Configuration>

In the above description, it has been described that the solid-state imaging device 1 is formed on one semiconductor substrate 11, but the solid-state imaging device 1 may be configured by separately forming circuits on a plurality of semiconductor substrates 11.

Figure 5:
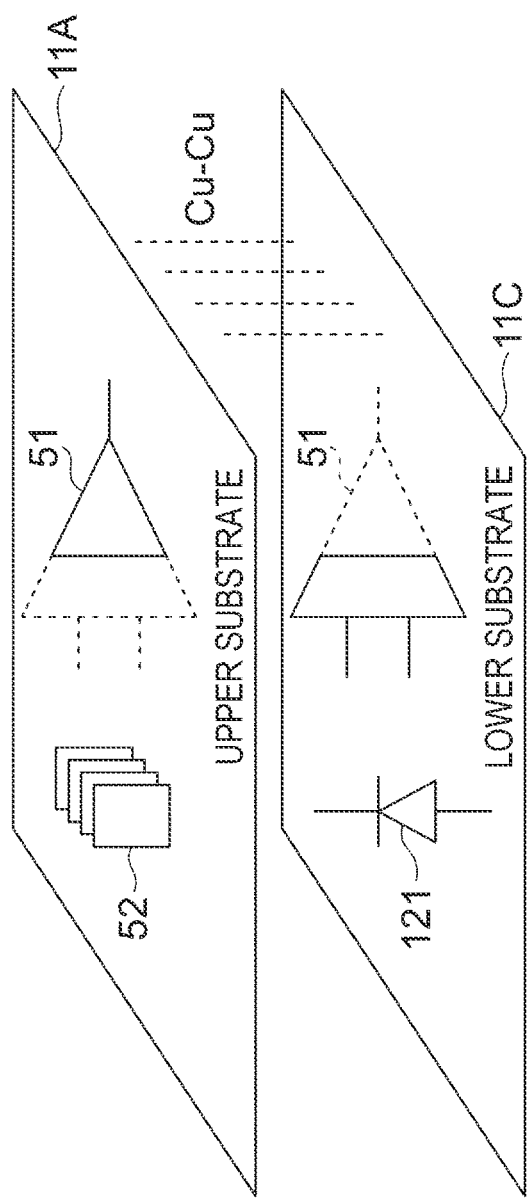
FIG. 5 is a conceptual diagram of forming the solid-state imaging device by stacking two semiconductor substrates of an upper substrate and a lower substrate.

FIG. 5 illustrates a conceptual diagram of forming the solid-state imaging device 1 by stacking two semiconductor substrates 11 of an upper substrate 11A and a lower substrate 11C.

At least the data storage unit 52 that stores the time code and the time code transfer unit 23 are formed on the upper substrate 11A. At least the pixel circuit 41 including the photodiode 121 is formed on the lower substrate 11C. The upper substrate 11A and the lower substrate 11C are bonded by, for example, metal bonding of Cu—Cu or the like.

Figure 6:
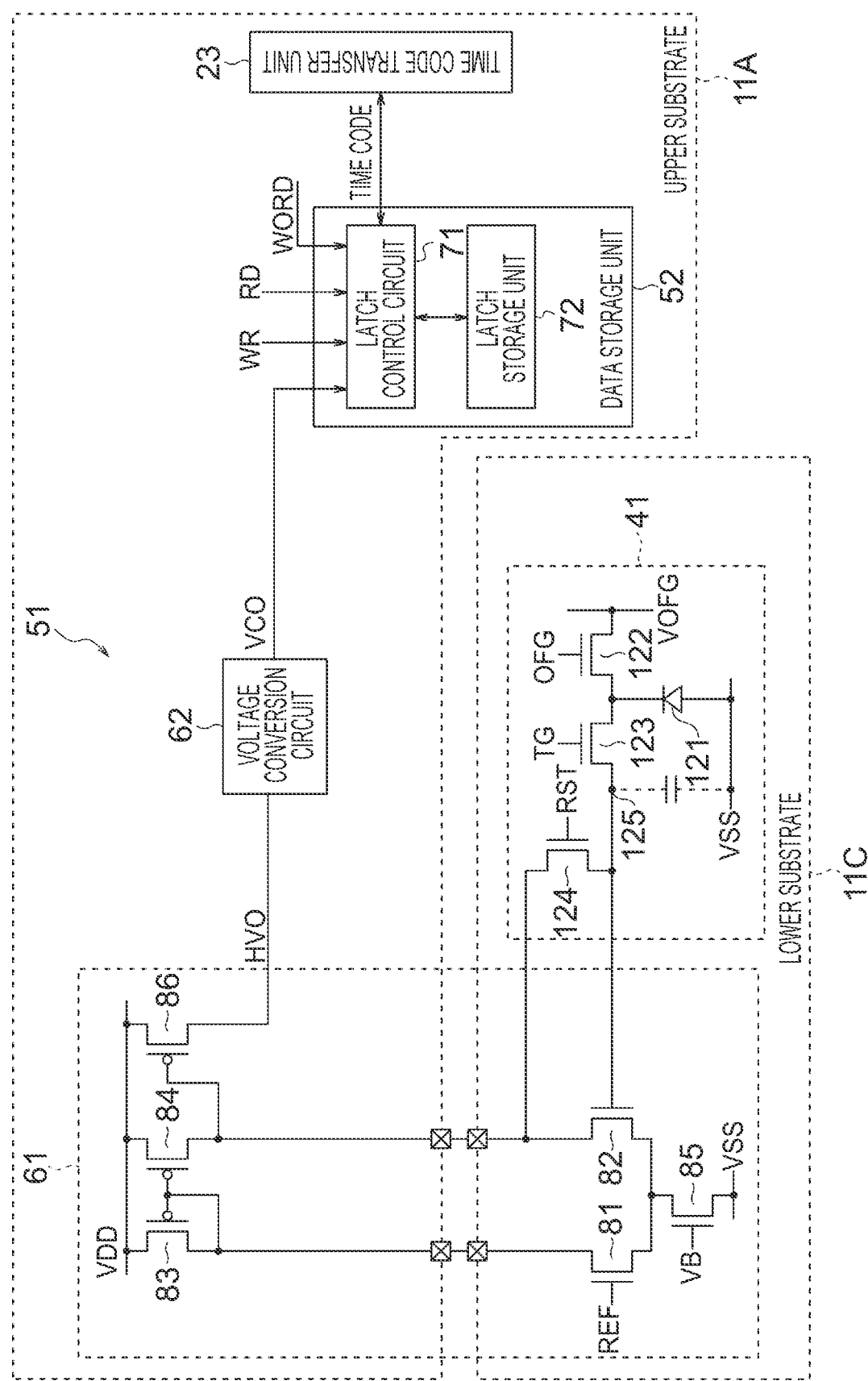
FIG. 6 is a circuit configuration example formed on each of the upper substrate and the lower substrate.

FIG. 6 illustrates a circuit configuration example formed on each of the upper substrate 11A and the lower substrate 11C. Note that the solid-state imaging device 1 can also include three semiconductor substrates 11.

A circuit of the ADC 42 excluding the transistors 81, 82, and 85 and the time code transfer unit 23 are formed on the upper substrate 11A. The pixel circuit 41 and circuits of the transistors 81, 82, and 85 of the differential input circuit 61 of the ADC 42 are formed on the lower substrate 11C.

First Embodiment

Figure 7:
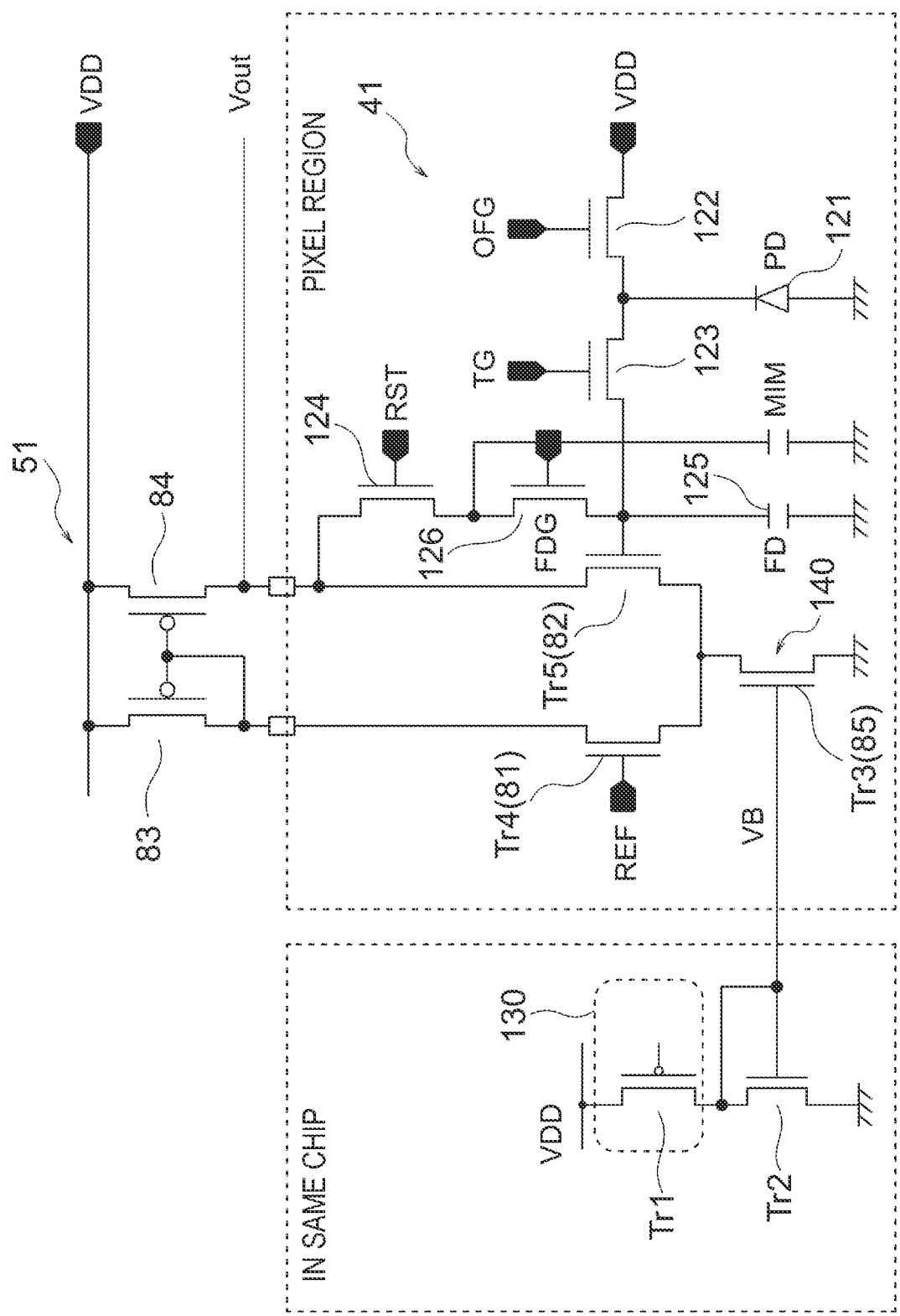
FIG. 7 is a circuit diagram illustrating a configuration example of a solid-state imaging device according to an embodiment.

FIG. 7 is a circuit diagram illustrating a configuration example of the solid-state imaging device 1 according to the first embodiment.

The solid-state imaging device 1 illustrated in FIG. 7 includes a pixel circuit 41 and a comparison circuit 51 as in FIG. 6.

The pixel circuit 41 has an FD 125 that accumulates charge generated by photoelectric conversion according to the amount of light received by the pixel 21. Note that FIG. 7 illustrates the load capacitance unit MIM and the switching transistor 126 to which the signal FDG is input, in addition to the pixel circuit 41 described in FIG. 4. The switching transistor 126 is connected between the reset transistor 124 and the FD 125. Furthermore, the load capacitance unit MIM is connected between the gate of the switching transistor 126 and the ground. The switching transistor 126 is turned on or off according to the signal FDG input to the gate. Thus, it is possible to switch the conversion efficiency of the FD 125 by switching the electrical connection between the FD 125 and the load capacitance unit MIM.

The comparison circuit 51 compares a voltage corresponding to the accumulated charge of the FD 125 with a reference voltage. Note that the transistors 81, 82, and 85 are hereinafter referred to as a fourth transistor Tr4, a fifth transistor Tr5, and a third transistor Tr3, respectively.

Here, in a case where the ADC 42 is provided for each pixel, as illustrated in FIGS. 6 and 7, the pixel circuit 41 and the output side of the differential input circuit 61 that is a comparator circuit are connected via Cu—Cu connection. In this case, for example, when resetting the charge of the FD 125, it becomes difficult to directly supply the voltage from the first power supply voltage VDD of the differential input circuit 61 to the FD 125. This is because a voltage drop occurs across the differential input circuit 61, and the input voltage to the reset transistor 124 decreases from the first power supply voltage VDD. In this case, the reset potential of the FD 125 decreases, and the potential relationship with the transfer transistor 123 is disadvantageous from the viewpoint of electric charge pumping. Consequently, the influence of noise increases.

Accordingly, the solid-state imaging device 1 of the present embodiment further includes a boosting unit 130 that raises the potential of (one end side of) the FD 125 at the time of photoelectric conversion.

In the example illustrated in FIG. 7, the boosting unit 130 includes a first transistor Tr1 that controls the current flowing through the comparison circuit 51 so that the potential of the FD 125 increases at the time of photoelectric conversion. The first transistor Tr1 is, for example, a PMOS transistor.

Furthermore, more specifically, the solid-state imaging device 1 further includes a current source 140 that generates a current flowing through the comparison circuit 51. The first transistor Tr1 controls the current generated by the current source 140. In the example illustrated in FIG. 7, the current source 140 includes a third transistor Tr3 that causes a current to flow in the comparison circuit 51.

Furthermore, the solid-state imaging device 1 further includes a second transistor Tr2. The second transistor Tr2 is, for example, an NMOS transistor. The current source 140 controls the current flowing through the comparison circuit 51 according to the current flowing through the second transistor Tr2. That is, the second transistor Tr2 is arranged and connected so as to form a current mirror circuit together with the third transistor Tr3. In the example illustrated in FIG. 7, the second transistor Tr2 is diode-connected, and the gate of the third transistor Tr3 is connected to the gate of the second transistor Tr2.

Figure 8:
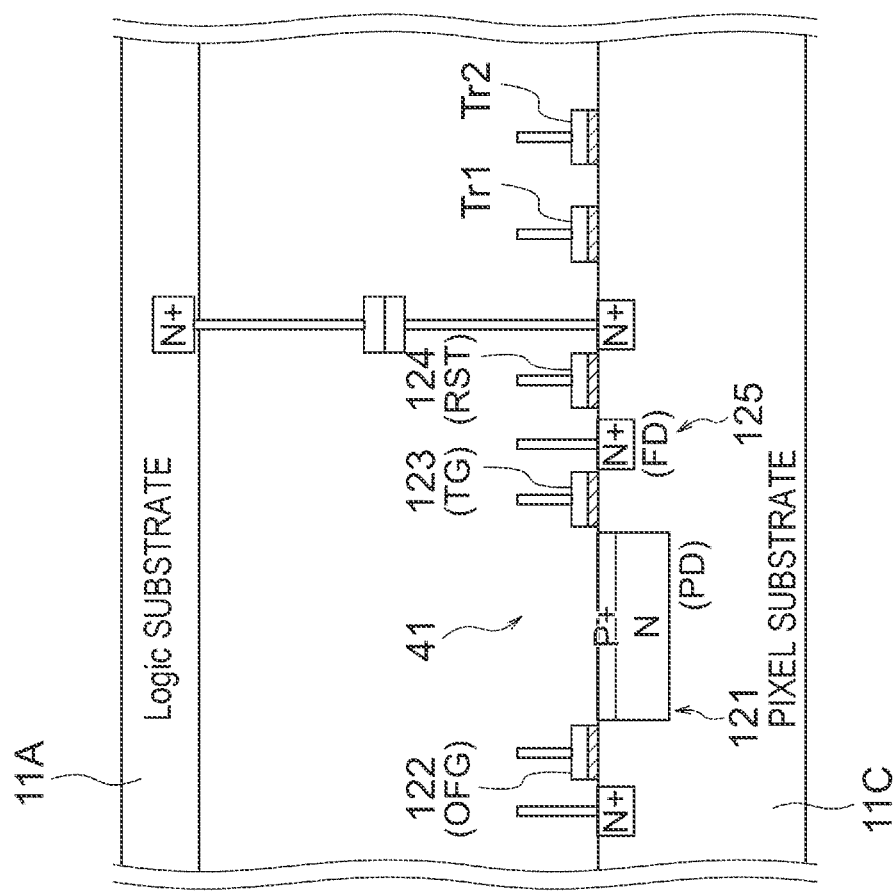
FIG. 8 is a diagram illustrating an example of arrangement of a first transistor in FIG. 7 in the stacked semiconductor substrates.

FIG. 8 is a diagram illustrating an example of the arrangement of the first transistor Tr1 of FIG. 7 in the stacked semiconductor substrates 11. In the example illustrated in FIG. 8, as in FIGS. 5 and 6, the upper substrate 11A is a logic substrate (logic circuit substrate), and the lower substrate 11C is a pixel substrate including the pixel circuit 41. Light is incident on the photodiode 121 from the lower side of FIG. 8 toward the lower substrate 11C. Furthermore, the N+region is used for a contact in each semiconductor substrate 11.

In the example illustrated in FIG. 8, the first transistor Tr1 and the second transistor Tr2 are arranged in the lower substrate 11C on which the pixel circuit 41 is arranged. That is, the first transistor Tr1 and the second transistor Tr2 are provided in the same chip as the pixel region, that is, in the lower substrate 11C. In the example illustrated in FIG. 7, the "pixel region" is a region including the pixel circuit 41, the fourth transistor, the fourth transistor Tr4, the fifth transistor Tr5, and the current source 140 (third transistor Tr3).

Furthermore, as illustrated in FIG. 7, the first transistor Tr1 is connected between the first power supply voltage VDD and the second transistor Tr2. The second transistor Tr2 is connected between the first transistor Tr1 and the ground. That is, the first transistor Tr1 is cascode-connected to the second transistor Tr2. Therefore, a current flowing through the second transistor Tr2 is controlled by a gate voltage of the first transistor Tr1. That is, the first transistor Tr1 can control the input bias current VB. A gate voltage of the third transistor Tr3 is raised when the first transistor Tr1 is turned on. Furthermore, the gate of the third transistor Tr3 is capacitively coupled to the FD 125. Thus, a voltage of the FD 125 can be raised by the gate voltage of the first transistor Tr1.

A voltage at which the first transistor Tr1 is turned on is applied to the gate of the first transistor Tr1. More specifically, for example, a voltage lower than the first power supply voltage VDD by a threshold voltage is applied to the gate of the first transistor Tr1. Furthermore, a pulsed voltage is applied to the gate of the first transistor Tr1.

Figure 9:
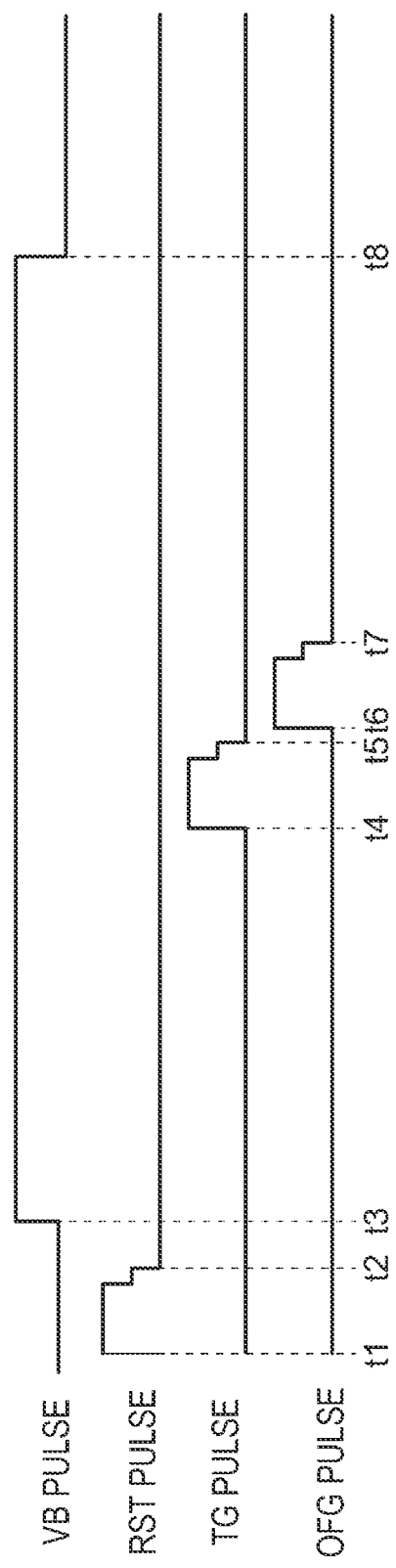
FIG. 9 is a timing chart illustrating an example of operation of the solid-state imaging device.

FIG. 9 is a timing chart illustrating an example of the operation of the solid-state imaging device 1. FIG. 9 is a diagram illustrating operations of the third transistor Tr3, the reset transistor 124, the transfer transistor 123, and the discharge transistor 122 to which pulses of the input bias currents VB, RST signal, TG signal, and OFG signal are input, respectively.

Note that a pulse voltage of the gate voltage input to the first transistor Tr1 corresponds to a pulse current of the input bias current VB. The first transistor Tr1 is driven in accordance with a timing of resetting the charge of the FD 125. More specifically, the pulse voltage is input to the gate of the first transistor Tr1 so as to be driven after operation of the reset transistor 124.

First, since the RST voltage changes from low to high at time t1, the reset transistor 124 is turned on, and the charge accumulated in the FD 125 is reset. Thereafter, at time t2, the reset transistor 124 is turned off.

Thereafter, at time t3, the input bias current VB increases since the input bias current VB changes from low to high. That is, the third transistor Tr3 causes a substantially constant current to flow through the comparison circuit 51, and the first transistor Tr1 increases the current flowing through the third transistor Tr3 in a predetermined period after resetting the charge of the FD 125. Thus, the gate voltage of the third transistor Tr3 increases. Here, since the third transistor Tr3 and the FD 125 are arranged so as to be close to each other, the potential of the FD 125 increases due to an increase in the gate voltage of the third transistor Tr3. Consequently, decrease in the reset potential of the FD 125 can be suppressed, and the influence of noise can be suppressed.

Thereafter, at time t4, since the TG voltage changes from low to high, the transfer transistor 123 is turned on, and the charge generated by the photodiode 121 is transferred to the FD 125. Thereafter, at time t5, the transfer transistor 123 is turned off.

Thereafter, at time t6, since the OFG signal changes from low to high, the discharge transistor 122 is turned on, and the potential of the photodiode 121 is reset to the first power supply voltage VDD. This is because the drain of the discharge transistor 122 is connected to the first power supply voltage VDD as illustrated in FIG. 7. Thereafter, at time t7, the discharge transistor 122 is turned off.

Thereafter, at time t8, the input bias current VB returns to the current value before time t3. Therefore, the constant current flowing through the differential transistor pair (the fourth transistor Tr4 and the fifth transistor Tr5) decreases.

In this manner, the first transistor Tr1 is turned on at the time of pixel reading. More specifically, for example, the first transistor Tr1 is turned on after the reset of the FD 125 by the reset transistor 124, and is turned off at the end of the P-phase (pre-charge phase) in the CDS processing.

As described above, according to the first embodiment, the third transistor Tr3 and the FD 125 are arranged close to each other. Furthermore, the first transistor Tr1 controls the current flowing through the third transistor to raise the potential of the FD 125 at the time of photoelectric conversion. Thus, it is possible to suppress a decrease in the reset potential of the FD 125 due to the passage through the differential input circuit 61, and the potential of the FD 125 can be deepened. Consequently, the influence of noise can be suppressed.

Note that the first transistor Tr1 is not limited to the pulse drive illustrated in FIG. 9, and may be continuously in the ON state.

Figure 10:
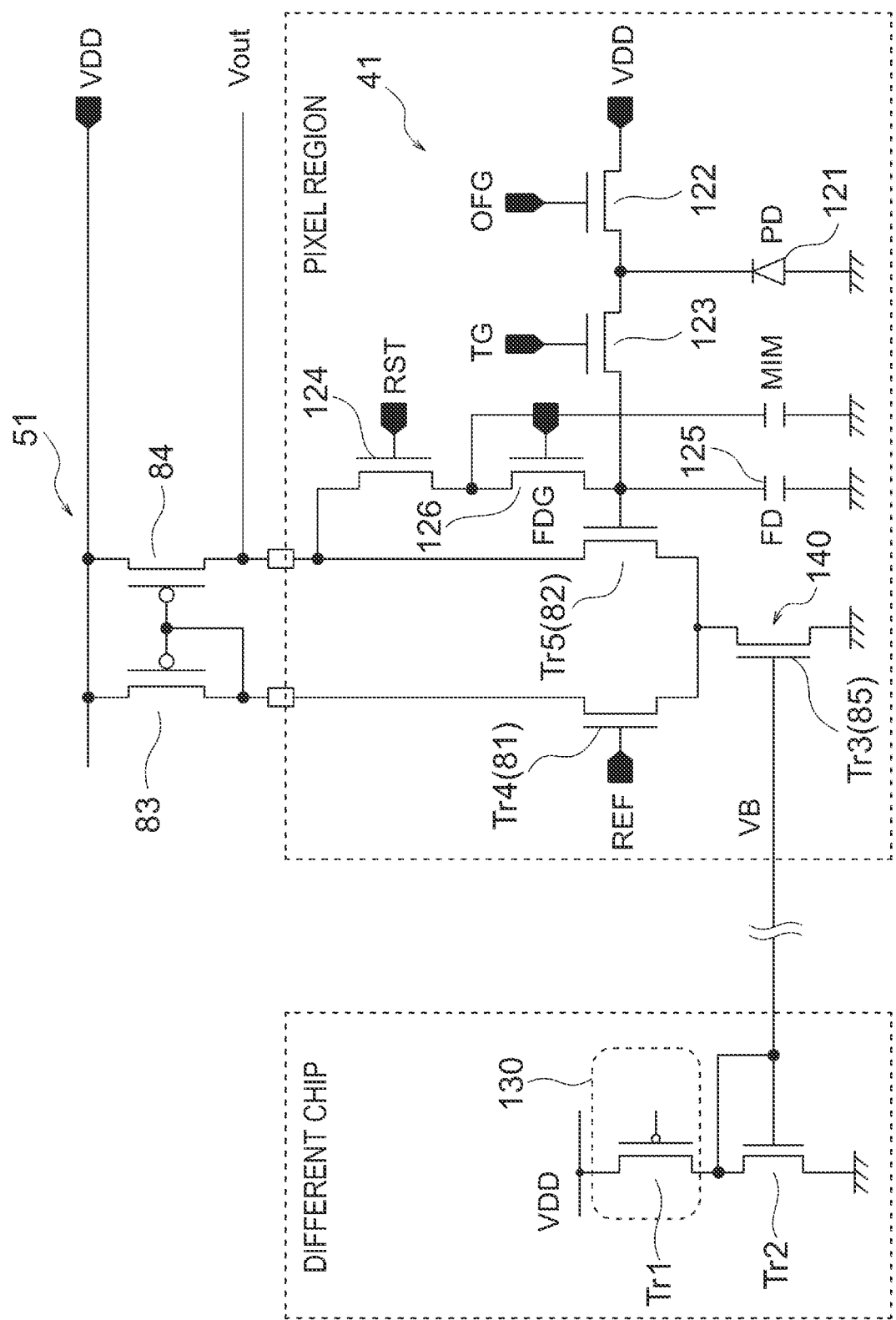
FIG. 10 is a circuit diagram illustrating a first modification of the configuration of the solid-state imaging device in FIG. 7.

FIG. 10 is a circuit diagram illustrating a first modification of the configuration of the solid-state imaging device 1 in FIG. 7. FIG. 10 is different from FIG. 7 in that the first transistor Tr1 and the second transistor Tr2 are arranged on a chip different from the chip of the pixel circuit 41.

Figure 11A:
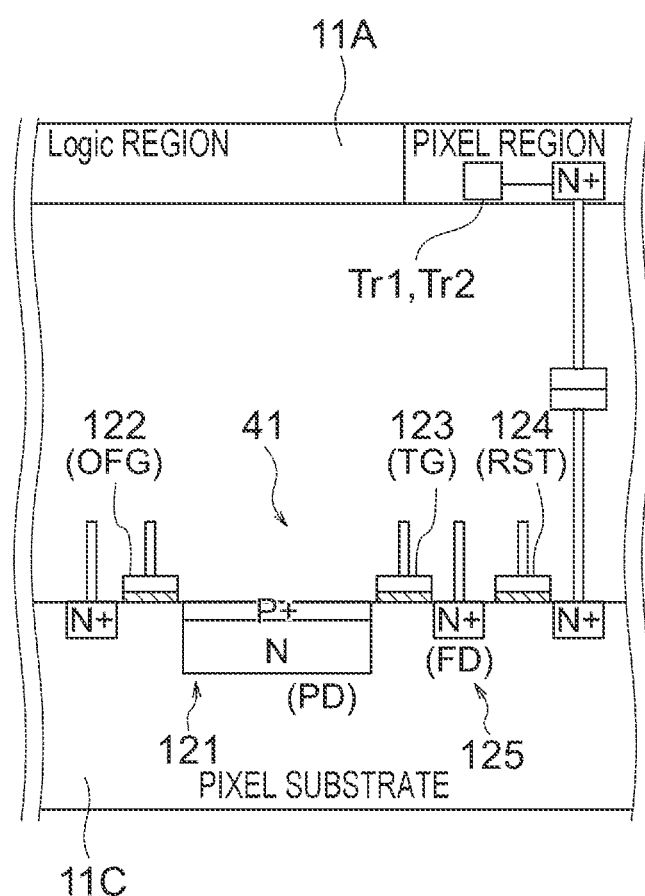
FIG. 11A is a diagram illustrating an example of arrangement of the first transistor in FIG. 10 in the stacked semiconductor substrates.

FIG. 11A is a diagram illustrating an example of arrangement of the first transistor in FIG. 10 in the stacked semiconductor substrates 11. FIG. 11A is different from FIG. 8 in that the first transistor Tr1 and the second transistor Tr2 are arranged on the upper substrate 11A.

Figure 11B:
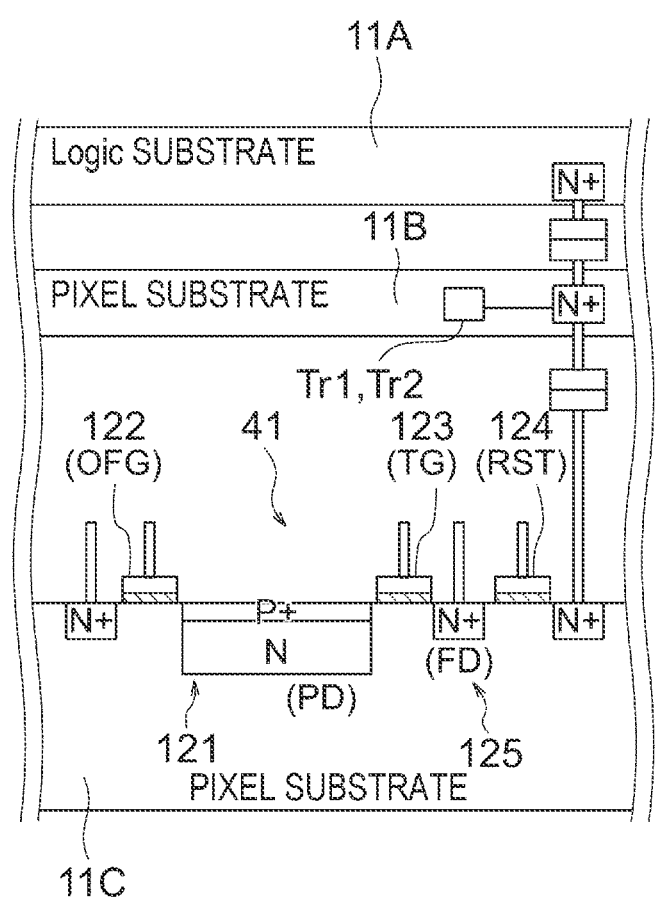
FIG. 11B is a diagram illustrating a modification of arrangement of the first transistor in FIG. 10 in the stacked semiconductor substrates.

FIG. 11B is a diagram illustrating a modification of the arrangement of the first transistor Tr1 of FIG. 10 in the stacked semiconductor substrates 11. FIG. 11B is different from FIG. 8 in that the first transistor Tr1 and the second transistor Tr2 are arranged on an intermediate substrate 11B arranged between the upper substrate 11A and the lower substrate 11C.

That is, the solid-state imaging device 1 includes a first chip and a second chip. The pixel circuit 41 having the FD 125 is arranged on the first chip. The second chip is stacked on the first chip, and at least a part of the boosting unit 130 including the first transistor Tr1 is arranged.

Furthermore, in FIGS. 11A and 11B, in a case where the first transistor Tr1 and the second transistor Tr2 are arranged on a chip different from the pixel circuit 41, the arranged chip may be a logic substrate or a pixel substrate.

Figure 12:
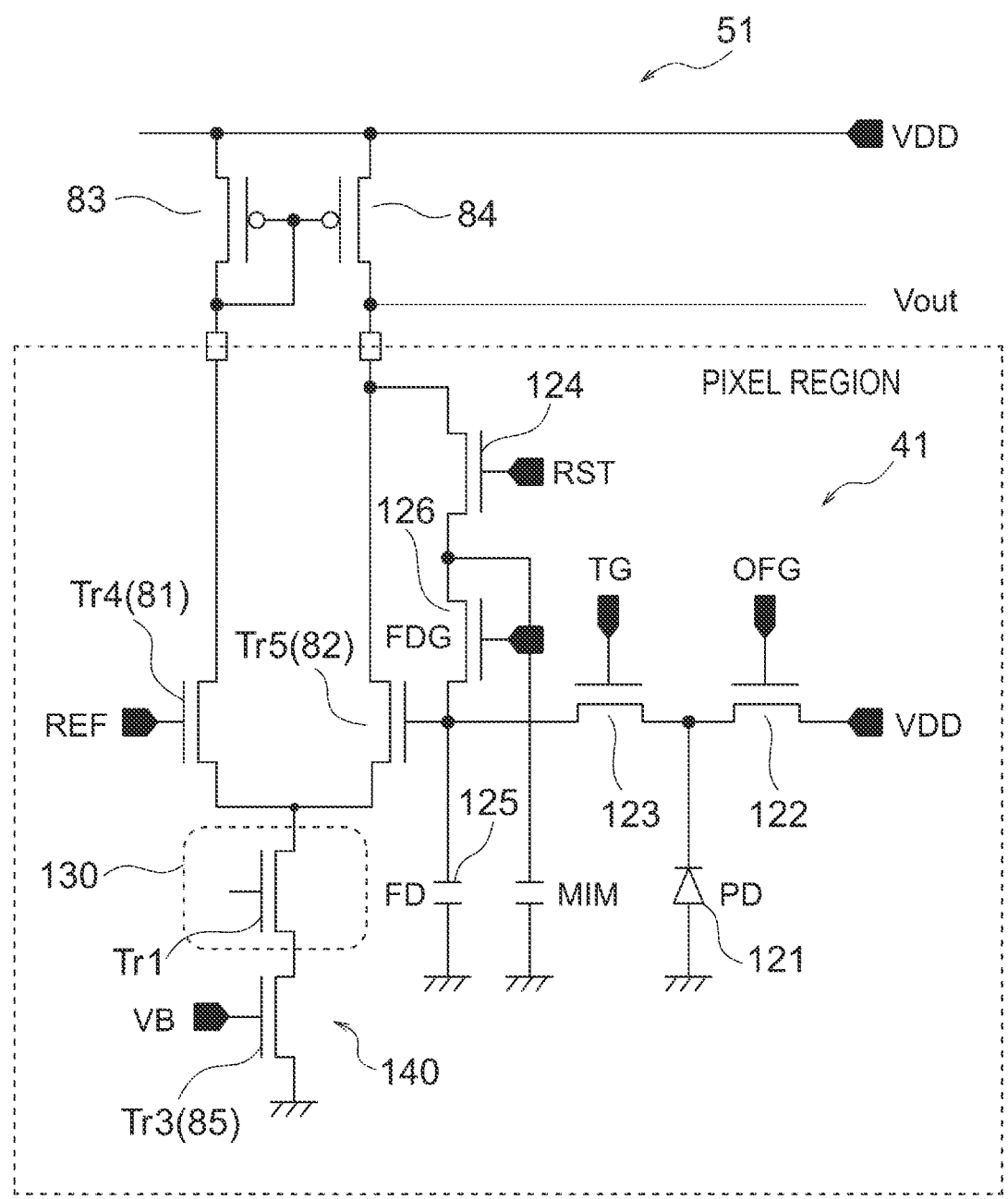
FIG. 12 is a circuit diagram illustrating a second modification of the configuration of the solid-state imaging device in FIG. 7.

FIG. 12 is a circuit diagram illustrating a second modification of the configuration of the solid-state imaging device 1 in FIG. 7. FIG. 12 is different from FIG. 7 in that the first transistor Tr1 is arranged in the pixel region. Note that, the third transistor Tr3 is connected to the second transistor Tr2 (not illustrated) as in FIG. 7.

In the example illustrated in FIG. 12, the first transistor Tr1 is cascode-connected to the third transistor Tr3. Furthermore, the first transistor Tr1 is, for example, an NMOS transistor.

Furthermore, more specifically, the comparison circuit 51 includes a differential transistor pair that outputs a signal corresponding to a differential voltage between the voltage corresponding to the accumulated charge of the FD 125 and the reference voltage. The differential transistor pair includes a fourth transistor Tr4 and a fifth transistor Tr5. The first transistor Tr1 is connected between the differential transistor pair and the third transistor Tr3.

Even in a case where the first transistor Tr1 is arranged in the pixel region, the voltage of the FD 125 can be raised by the gate voltage.

Figure 13:
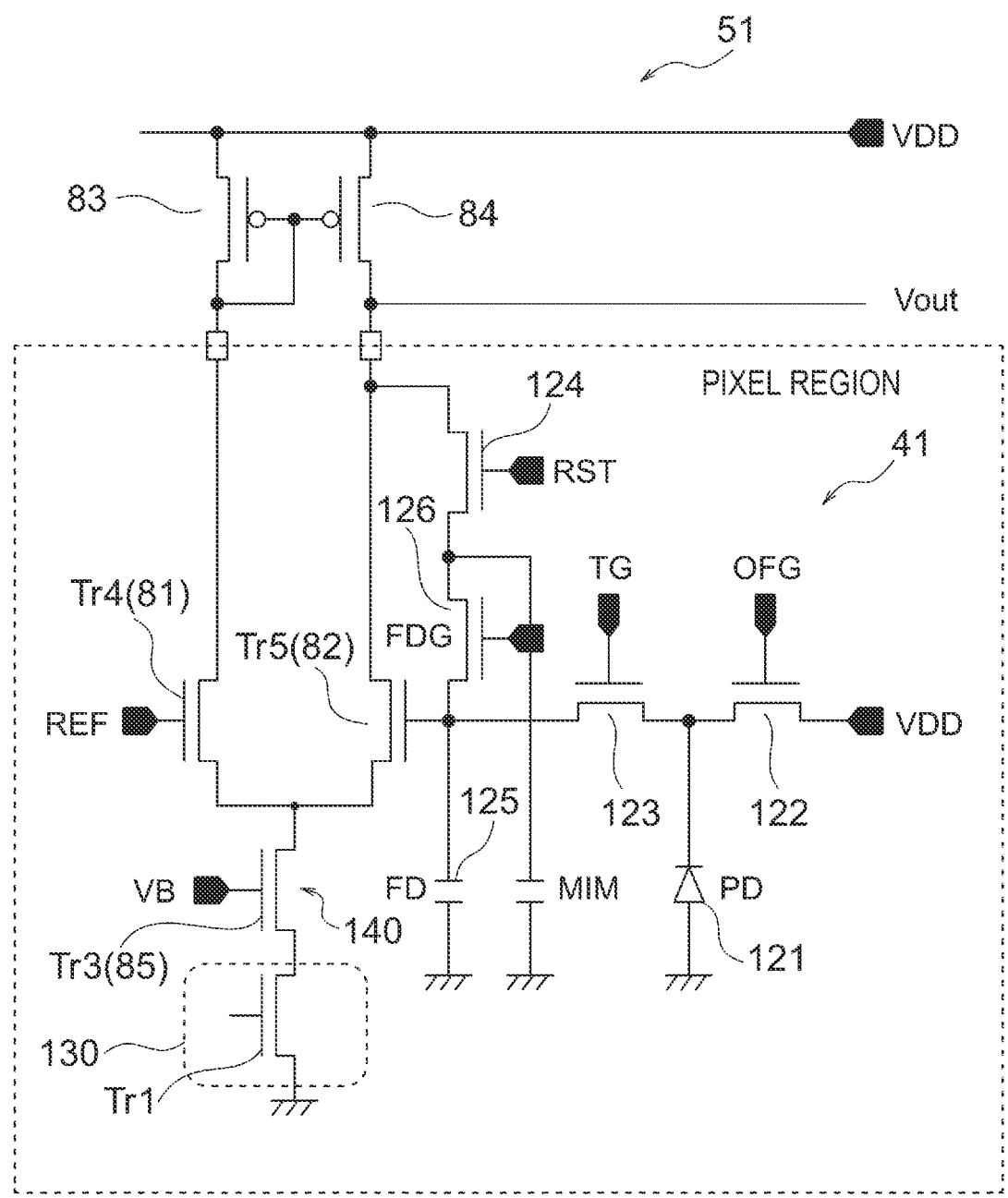
FIG. 13 is a circuit diagram illustrating a third modification of the configuration of the solid-state imaging device in FIG. 7.

FIG. 13 is a circuit diagram illustrating a third modification of the configuration of the solid-state imaging device 1 in FIG. 7. FIG. 13 is different from FIG. 11 in the arrangement of the first transistor Tr1 in the pixel region.

In the example illustrated in FIG. 13, the third transistor Tr3 is connected between the differential transistor pair, the first transistor, and Tr1. That is, the first transistor Tr1 is arranged between the fourth transistor Tr4 and the ground.

Figure 14:
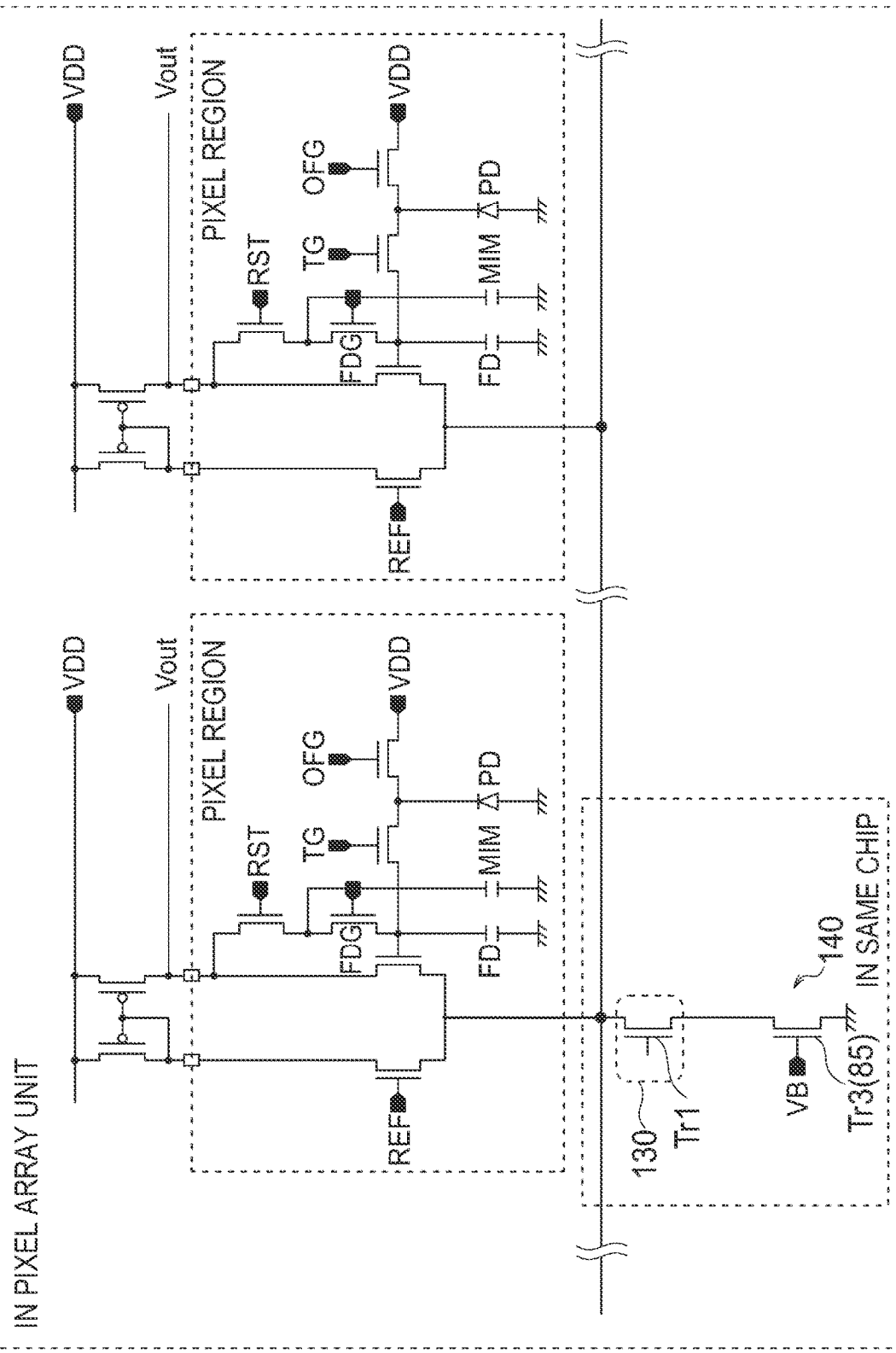
FIG. 14 is a circuit diagram illustrating a fourth modification of the configuration of the solid-state imaging device in FIG. 7.

FIG. 14 is a circuit diagram illustrating a fourth modification of the configuration of the solid-state imaging device 1 in FIG. 7. FIG. 13 is different from FIG. 12 in that the first transistor Tr1 is shared by a plurality of pixel circuits 41.

In the example illustrated in FIG. 14, the first transistor Tr1 and the third transistor Tr3 are shared by a plurality of pixels 21 each having the FD 125. That is, the first transistor Tr1 is connected to a plurality of differential transistor pairs in a plurality of pixel regions. Thus, the number of the first transistors Tr1 and the third transistors Tr3 installed is reduced, so that the area of the pixel array unit 22 can be suppressed. Furthermore, the first transistor Tr1 and the third transistor Tr3 are arranged in a chip on which the pixel circuit 41 having the FD 125 is arranged. As illustrated in FIG. 14, the first transistor Tr1 and the third transistor Tr3 may be arranged in the pixel array unit 22, or may be arranged in a space where the area of the pixel array unit 22 can be suppressed. In the example illustrated in FIG. 14, the first transistor Tr1 and the third transistor Tr3 are arranged outside the pixel region. Furthermore, the connection between the first transistor Tr1 and the plurality of pixels may be directly connected by wiring, or may be connected via a diffusion layer.

Figure 15:
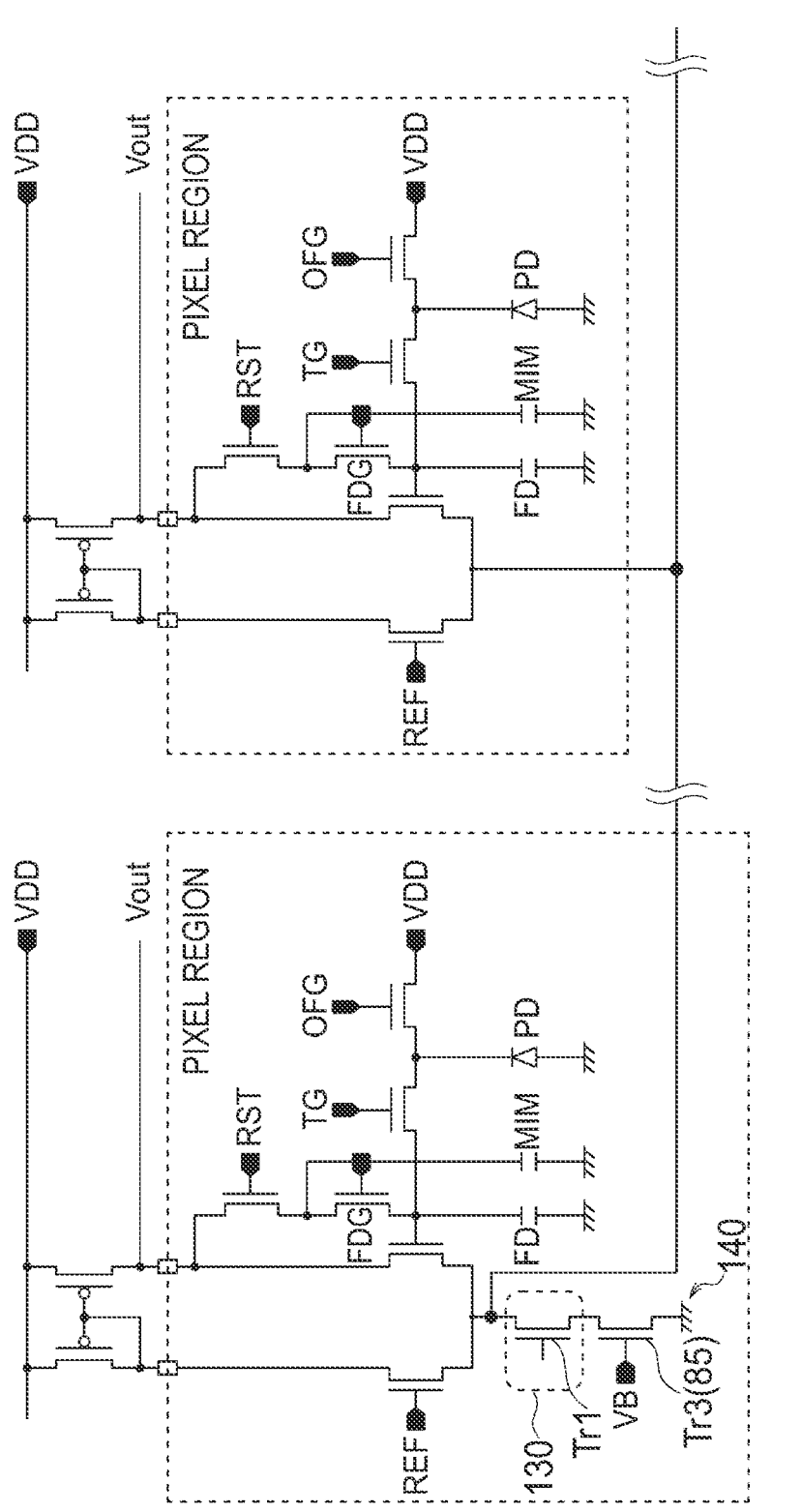
FIG. 15 is a circuit diagram illustrating a fifth modification of the configuration of the solid-state imaging device in FIG. 7.

FIG. 15 is a circuit diagram illustrating a fifth modification of the configuration of the solid-state imaging device 1 in FIG. 7. FIG. 15 is different from FIG. 14 in the arrangement of the shared first transistor Tr1.

In the example illustrated in FIG. 15, the first transistor Tr1 and the third transistor Tr3 are arranged in the pixel region of one pixel 21 among the plurality of pixels 21. That is, the first transistor Tr1 in the pixel region of a certain pixel 21 is also connected to the differential transistor pair in the pixel region of another pixel 21.

Note that, in the first embodiment, a plurality of modifications may be combined.

Second Embodiment

Figure 16:
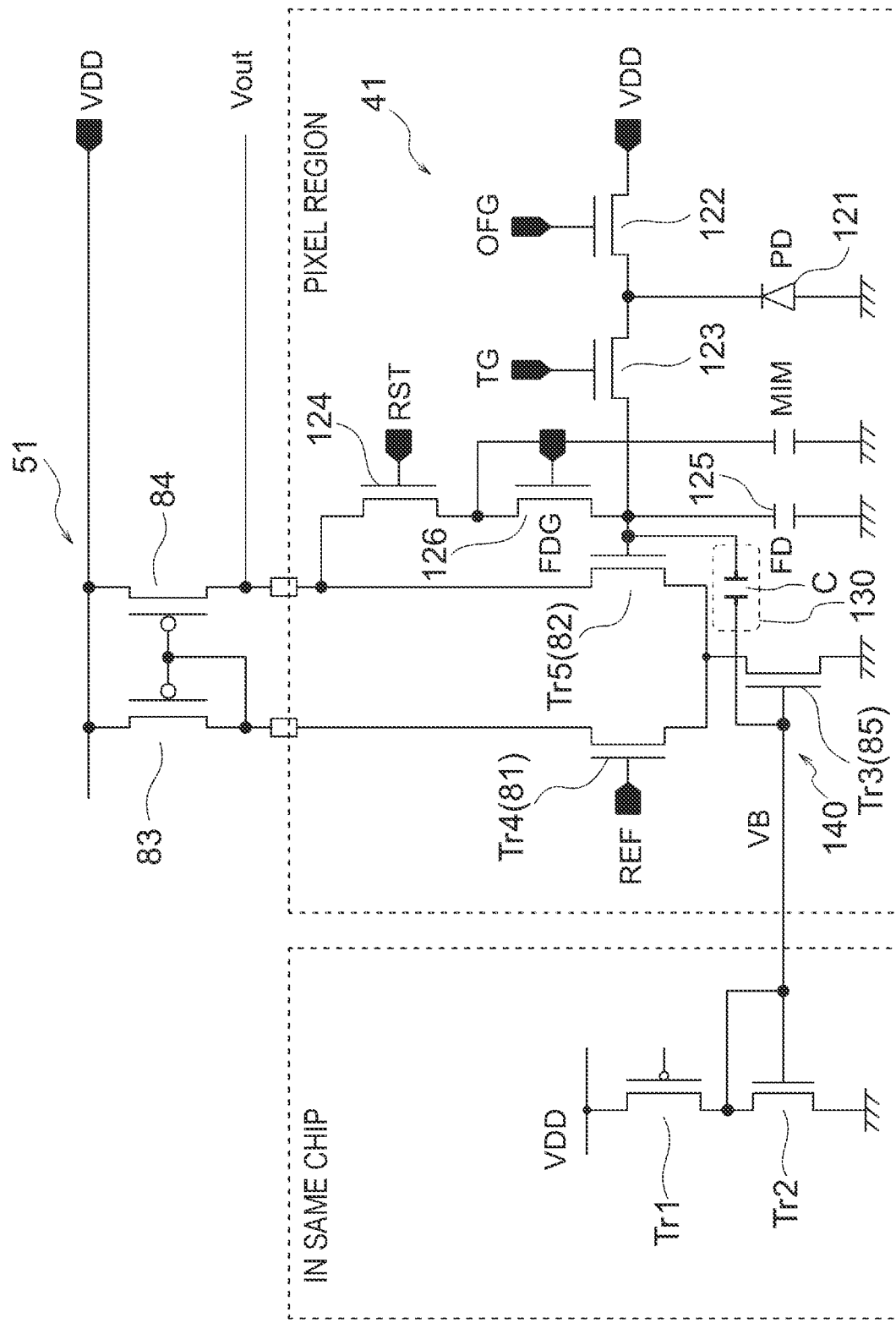
FIG. 16 is a circuit diagram illustrating a configuration example of a solid-state imaging device according to a second embodiment.

FIG. 16 is a circuit diagram illustrating a configuration example of a solid-state imaging device 1 according to a second embodiment. FIG. 16 is different from FIG. 7 in that a capacitor C is used as the boosting unit 130. Note that, in the example illustrated in FIG. 16, the first transistor Tr1 described in the first embodiment is arranged. In the second embodiment, the first transistor Tr1 is not necessarily arranged. However, in a case where the first transistor Tr1 is used, the voltage of the FD 125 can be further increased, which is more preferable from the viewpoint of noise suppression.

In the example illustrated in FIG. 16, the boosting unit 130 raises the potential of the FD 125 using capacitive coupling. More specifically, the boosting unit 130 raises the potential of the FD 125 by capacitive coupling between the gate wiring of the transistor constituting the current source 140 and the FD 125. The boosting unit 130 has a capacitor C that raises the voltage of the FD 125. The capacitor C is, for example, an inter-wiring capacitor arranged between the FD 125 and the gate of the third transistor Tr3. That is, the capacitor C is generated by capacitive coupling between the wiring of the FD 125 and the gate wiring of the third transistor Tr3 adjacent to each other.

Figure 17:
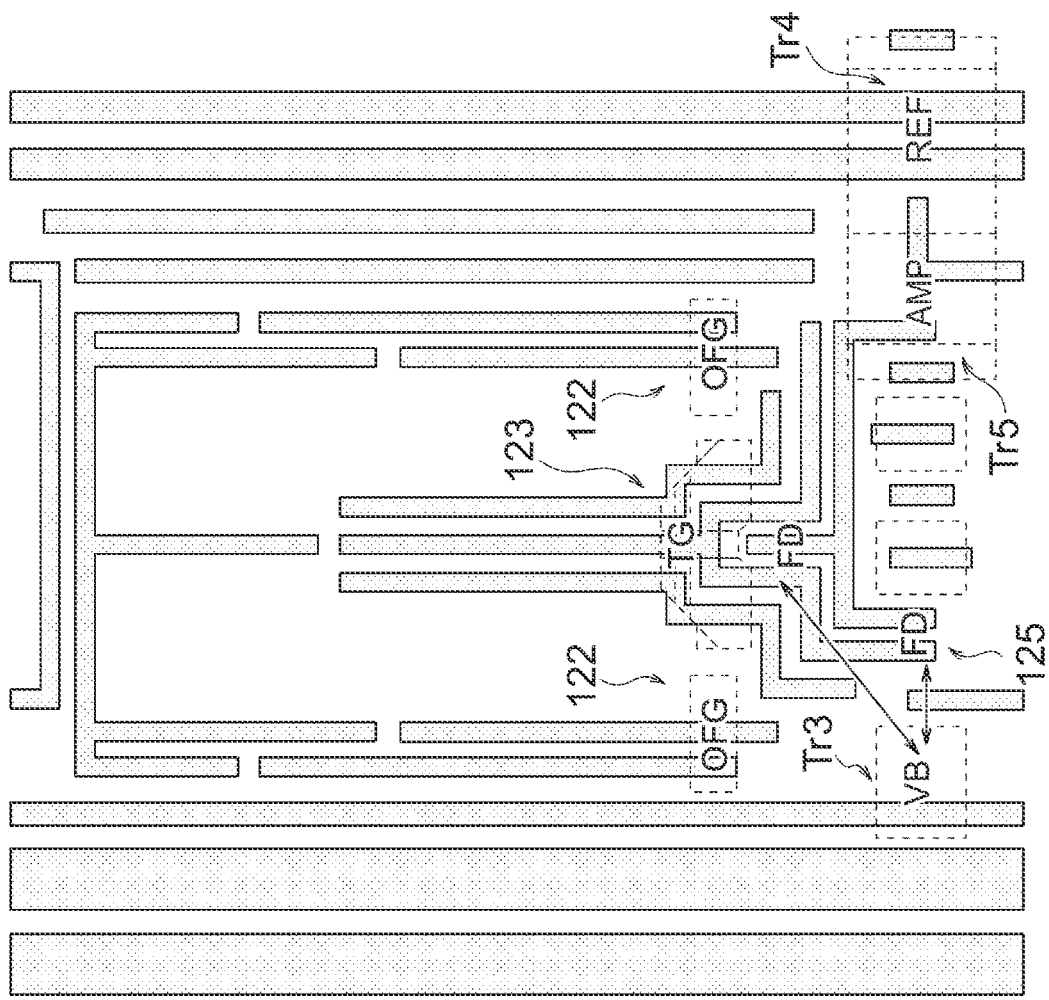
FIG. 17 is a layout diagram illustrating an example of arrangement of each configuration in the pixel region of FIG. 16.

FIG. 17 is a layout diagram illustrating an example of arrangement of each configuration in the pixel region of FIG. 16.

As indicated by an arrow in FIG. 17, the third transistor Tr3 and the FD 125 are arranged close to each other. Thus, the gate wiring of the third transistor Tr3 can be arranged so as to be adjacent to the FD 125, and the capacitor C illustrated in FIG. 16 is generated. Furthermore, the arrangement is not limited to the two-dimensional arrangement, and the gate wiring of the third transistor Tr3 and the wiring of the FD 125 may be arranged to three-dimensionally overlap (traverse) at least at one position. That is, capacitive coupling via an insulating layer in a chip in which a wiring layer and an insulating layer are alternately stacked is used for the capacitor C. In this case, the distance between the wirings can be further shortened, the width (area) of the wiring can be used as the electrode area of the capacitor C, and the potential of the FD 125 can be further raised.

As described above, in the second embodiment, the potential of the FD 125 is raised by capacitive coupling between the gate wiring of the transistor constituting the current source 140 and the FD 125. Thus, as in the first embodiment, it is possible to suppress a decrease in the reset potential of the FD 125 due to the passage through the differential input circuit 61, and to suppress the influence of noise.

Furthermore, the first embodiment and modifications thereof may be combined with the solid-state imaging device 1 of the second embodiment.

Figure 18:
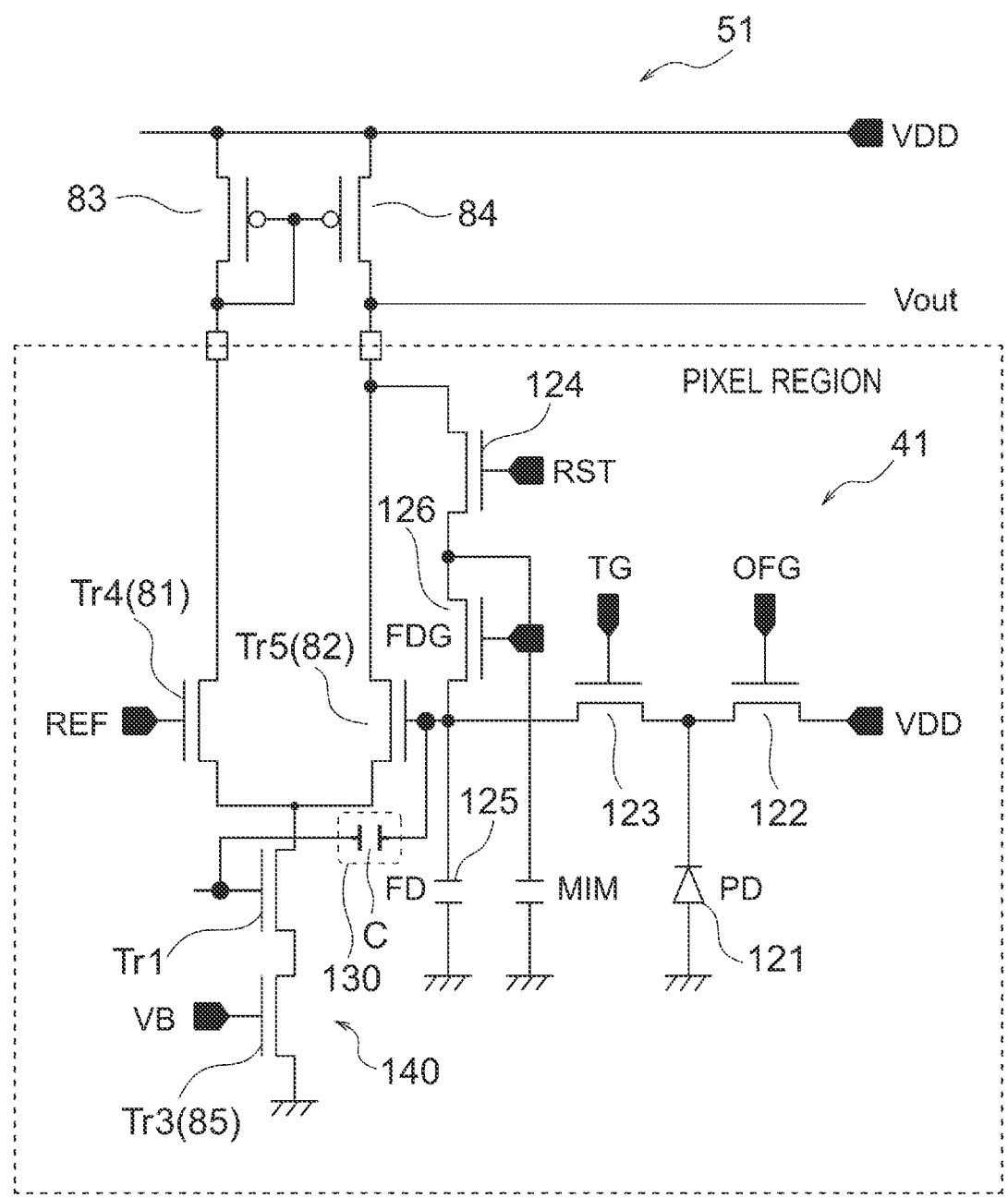
FIG. 18 is a circuit diagram illustrating a modification of the configuration of the solid-state imaging device 1 according to the second embodiment.

FIG. 18 is a circuit diagram illustrating a modification of the configuration of the solid-state imaging device 1 according to the second embodiment. FIG. 18 is a diagram illustrating an example in which the second embodiment is applied to FIG. 12 which is a second modification of the first embodiment. As illustrated in FIG. 18, the capacitor C may be connected between the gate wiring of the first transistor Tr1 and the FD 125. That is, the first transistor Tr1 and the FD 125 may be arranged to be close to each other.

<Application Example to Mobile Body>

The technology according to the present disclosure (the present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, a robot, and the like.

Figure 19:
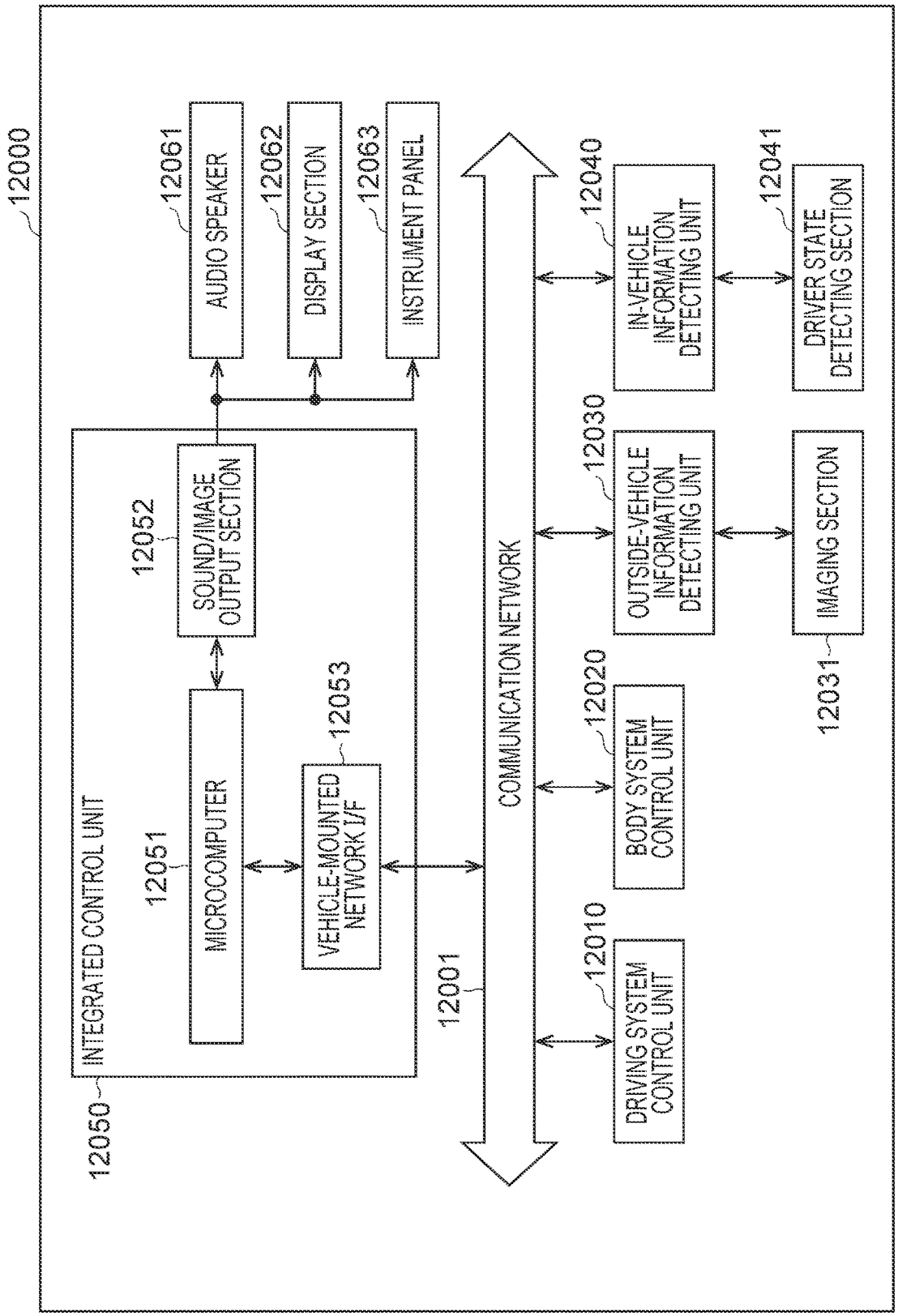
FIG. 19 is a block diagram illustrating an example of a schematic configuration of a vehicle control system.

FIG. 19 is a block diagram illustrating a schematic configuration example of a vehicle control system which is an example of a moving body control system to which the technology according to the present disclosure can be applied.

The vehicle control system 12000 includes a plurality of electronic control units connected to each other via a communication network 12001. In the example illustrated in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives input of these radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 causes the imaging section 12031 to capture an image outside the vehicle, and receives the captured image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light and outputs an electrical signal according to the amount of received light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041 includes, for example, a camera that captures an image of the driver, and the in-vehicle information detecting unit 12040 may calculate the degree of fatigue or the degree of concentration of the driver, or determine whether or not the driver is dozing on the basis of detection information input from the driver state detecting section 12041.

The microcomputer 12051 can calculate a control target value for the driving force generating device, the steering mechanism, or the braking device on the basis of the information about the inside or outside of the vehicle obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel in an automated manner without depending on the operation of the driver, or the like, by controlling the driving force generating device, the steering mechanism, the braking device, or the like on the basis of the information about the outside or inside of the vehicle obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare, such as controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying an occupant of the vehicle or the outside of the vehicle of information. In the example of FIG. 19, an audio speaker 12061, a display section 12062, and an instrument panel 12063 are illustrated as the output device. The display section 12062 may, for example, include at least one of an on-board display or a head-up display.

Figure 20:
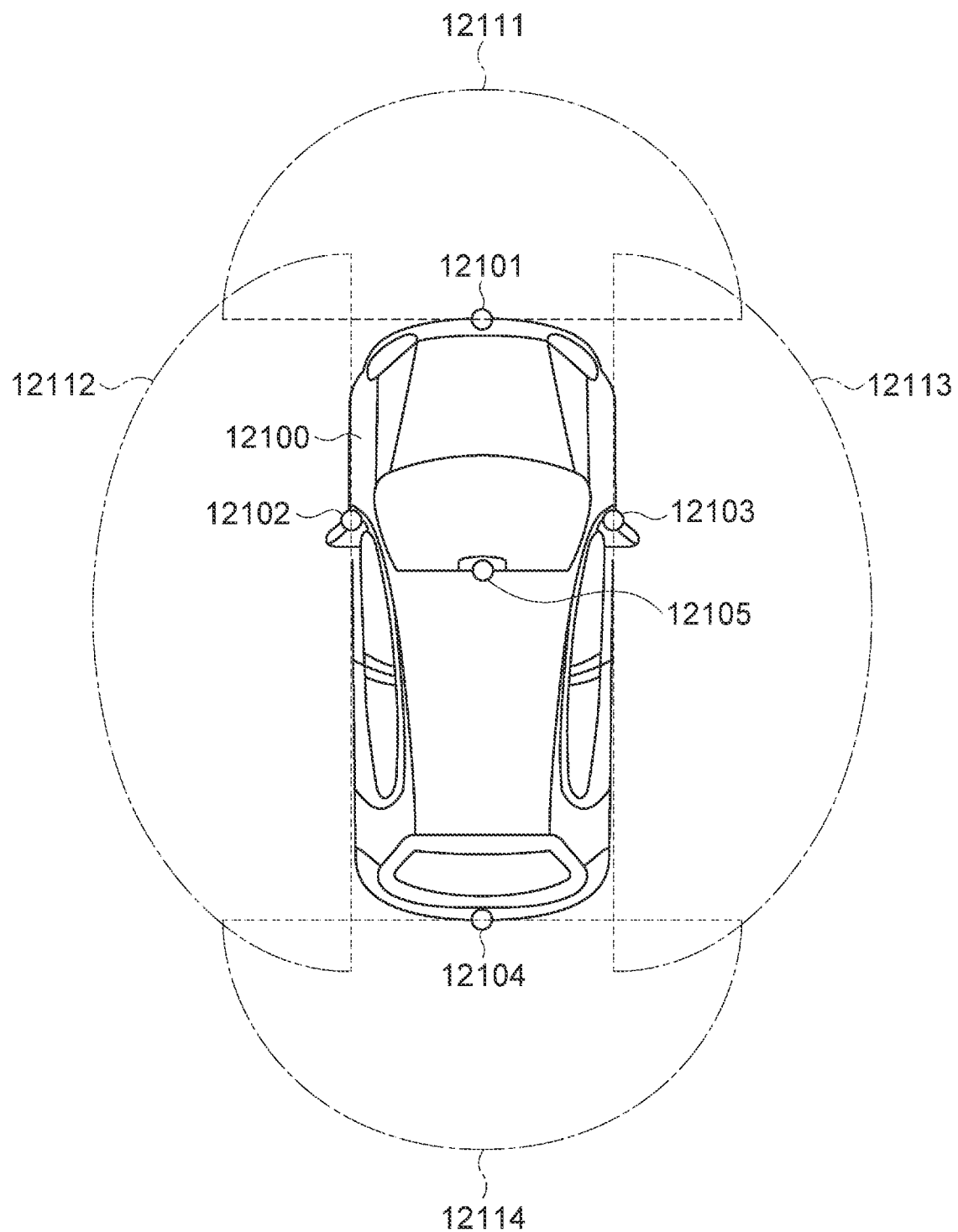
FIG. 20 is an explanatory diagram illustrating an example of installation positions of an outside-vehicle information detecting section and imaging sections.

FIG. 20 is a diagram illustrating an example of the installation position of the imaging section 12031.

In FIG. 20, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided on the front nose and the imaging section 12105 provided on the upper portion of the windshield within the interior of the vehicle obtain mainly an image of the front of the vehicle 12100. The imaging sections 12102 and 12103 provided on the sideview mirrors obtain mainly an image of the sides of the vehicle 12100. The imaging section 12104 provided on the rear bumper or the back door obtains mainly an image of the rear of the vehicle 12100. The forward image obtained by the imaging sections 12101 and 12105 are mainly used for detecting a preceding vehicle, a pedestrian, an obstacle, a traffic light, a traffic sign, a lane, and the like.

Note that FIG. 20 illustrates an example of imaging ranges of the imaging sections 12101 to 12104. An imaging range 12111 represents the imaging range of the imaging section 12101 provided on the front nose, imaging ranges 12112 and 12113 represent the imaging ranges of the imaging sections 12102 and 12103 provided in the side mirrors, respectively, and an imaging range 12114 represents the imaging range of the imaging section 12104 provided in the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, on the basis of distance information obtained from the imaging sections 12101 to 12104, the microcomputer 12051 can obtain a distance to each three-dimensional object in the imaging ranges 12111 to 12114, and a temporal change of this distance (relative speed to the vehicle 12100), and thereby extract, as a preceding vehicle, a three-dimensional object that is closest particularly on the traveling path of the vehicle 12100 and travels at a predetermined speed (for example, equal to or more than 0 km/h) in substantially the same direction as the vehicle 12100. Moreover, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel in an automated manner without depending on the operation of the driver or the like.

For example, the microcomputer 12051 can classify three-dimensional object data on three-dimensional objects into a two-wheeled vehicle, a standard-sized vehicle, a large-sized vehicle, a pedestrian, a utility pole, and other three-dimensional objects, and the like on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating the risk of collision with each obstacle, and when the collision risk is equal to or higher than a set value and there is a possibility of collision, the microcomputer 12051 can output a warning to the driver via the audio speaker 12061 and the display section 12062, or perform forced deceleration or avoidance steering via the driving system control unit 12010, to thereby perform assistance in driving for collision avoidance.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. Furthermore, the sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to, for example, the imaging sections 12031, 12101, 12102, 12103, 12104, and 12105, the driver state detecting section 12041, and the like among the above-described configurations. Specifically, for example, the solid-state imaging device 1 of the present disclosure can be applied to these imaging sections and detecting section. Then, by applying the technology according to the present disclosure, noise can be suppressed, so that safer vehicle traveling can be achieved.

Note that the present technology can have configurations as follows.

(1) A solid-state imaging device, including:
  a floating diffusion that accumulates charge generated by photoelectric conversion according to an amount of received light of a pixel;
  a comparison circuit that compares a voltage corresponding to accumulated charge of the floating diffusion with a reference voltage; and
  a boosting unit that raises a potential on one end side of the floating diffusion during photoelectric conversion.

(2) The solid-state imaging device according to (1), in which the boosting unit includes a first transistor that controls a current flowing through the comparison circuit in such a manner that a potential on one end side of the floating diffusion becomes high.

(3) The solid-state imaging device according to (2), further including
  a current source that generates a current flowing through the comparison circuit, in which
  the first transistor controls a current generated by the current source.

(4) The solid-state imaging device according to (3), further including
  a second transistor cascode-connected to the first transistor, in which
  the current source controls a current flowing through the comparison circuit according to a current flowing through the second transistor.

(5) The solid-state imaging device according to (4), in which a current flowing through the second transistor is controlled by a gate voltage of the first transistor.

(6) The solid-state imaging device according to (4) or (5), in which
  the current source includes a third transistor that causes a current to flow in the comparison circuit, and
  a gate of the third transistor is connected to a gate of the second transistor.

(7) The solid-state imaging device according to (6), in which a gate voltage of the third transistor is raised when the first transistor is turned on.

(8) The solid-state imaging device according to (6) or (7), in which a gate of the third transistor is capacitively coupled to the floating diffusion.

(9) The solid-state imaging device according to any one of (2) to (8), further including
a first chip on which a pixel circuit having the floating diffusion is arranged; and
a second chip stacked on the first chip and in which at least a part of the boosting unit including the first transistor is arranged.

(10) The solid-state imaging device according to (3), in which
the current source includes a third transistor that causes a current to flow in the comparison circuit, and
the first transistor is cascode-connected to the third transistor.

(11) The solid-state imaging device according to (10), in which
the comparison circuit includes a differential transistor pair that outputs a signal corresponding to a differential voltage between a voltage corresponding to the accumulated charge of the floating diffusion and the reference voltage, and
the first transistor is connected between the differential transistor pair and the third transistor.

(12) The solid-state imaging device according to (10), in which
the comparison circuit includes a differential transistor pair that outputs a signal corresponding to a differential voltage between a voltage corresponding to the accumulated charge of the floating diffusion and the reference voltage, and
the third transistor is connected between the differential transistor pair and the first transistor.

(13) The solid-state imaging device according to any one of (10) to (12), in which the first transistor and the third transistor are shared by a plurality of pixels each having the floating diffusion.

(14) The solid-state imaging device according to (13), in which the first transistor and the third transistor are arranged in a chip on which a pixel circuit having the floating diffusion is arranged.

(15) The solid-state imaging device according to (13) or (14), in which the first transistor and the third transistor are arranged in a pixel region of one pixel among the plurality of pixels.

(16) The solid-state imaging device according to (1), in which the boosting unit raises a potential on one end side of the floating diffusion using capacitive coupling.

(17) The solid-state imaging device according to (16), further including
a current source that generates a current flowing through the comparison circuit, in which
the boosting unit raises a potential on one end side of the floating diffusion by capacitive coupling between a gate wiring of a transistor constituting the current source and the floating diffusion.

(18) The solid-state imaging device according to any one of (1) to (17), further including:
a time code generator that generates a time code;
a time code transfer unit that transfers the time code generated by the time code generator;
a reference voltage generator that generates the reference voltage whose voltage level changes according to time; and
a time code holding unit that is provided for each pixel and holds the time code when the voltage corresponding to the accumulated charge of the floating diffusion and the reference voltage match as a digital signal corresponding to the amount of received light.

(19) The solid-state imaging device according to (18), in which the time code generator, the time code transfer unit, the reference voltage generator, and the time code holding unit are arranged on a chip different from a chip on which a pixel circuit having the floating diffusion is arranged.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

1 Solid-state imaging device
11A Upper substrate
11C Lower substrate
21 Pixel
23 Time code transfer unit
25 DAC
26 Time code generation unit
41 Pixel circuit
42 ADC
51 Comparison circuit
52 Data storage unit
61 Differential input circuit
125 FD
130 Boosting unit
140 Current source
Tr1 First transistor
Tr2 Second transistor
Tr3 Third transistor

The invention claimed is:

1. A solid-state imaging device, comprising:
a floating diffusion that accumulates charge generated by photoelectric conversion according to an amount of received light of a pixel;
a comparison circuit that compares a voltage corresponding to accumulated charge of the floating diffusion with a reference voltage; and
a boosting circuit that raises a potential on a first end side of the floating diffusion during photoelectric conversion, the boosting circuit including a first transistor that controls a current flowing through the comparison circuit in such a manner that the potential on the first end side of the floating diffusion becomes high;
a current source that generates a current flowing through the comparison circuit, wherein the first transistor controls a current generated by the current source; and
a second transistor cascode-connected to the first transistor, wherein
the current source controls a current flowing through the comparison circuit according to a current flowing through the second transistor.

2. The solid-state imaging device according to claim 1, wherein a current flowing through the second transistor is controlled by a gate voltage of the first transistor.

3. The solid-state imaging device according to claim 1, wherein
the current source includes a third transistor that causes a current to flow in the comparison circuit, and
a gate of the third transistor is connected to a gate of the second transistor.

4. The solid-state imaging device according to claim 3, wherein a gate voltage of the third transistor is raised when the first transistor is turned on.

5. The solid-state imaging device according to claim 3, wherein a gate of the third transistor is capacitively coupled to the floating diffusion.

6. The solid-state imaging device according to claim 1, further comprising:
a first chip on which a pixel circuit having the floating diffusion is arranged; and
a second chip stacked on the first chip and in which at least a part of the boosting circuit including the first transistor is arranged.

7. The solid-state imaging device according to claim 1, wherein the boosting circuit raises the potential on the first end side of the floating diffusion using capacitive coupling.

8. The solid-state imaging device according to claim 7, further comprising:
a current source that generates a current flowing through the comparison circuit, wherein
the boosting circuit raises the potential on the first end side of the floating diffusion by capacitive coupling between a gate wiring of a transistor constituting the current source and the floating diffusion.

9. The solid-state imaging device according to claim 1, further comprising:
a time code generator that generates a time code;
a time code transfer circuit that transfers the time code generated by the time code generator;
a reference voltage generator that generates the reference voltage whose voltage level changes according to time; and
a time code holding circuit that is provided for each pixel and holds the time code when the voltage corresponding to the accumulated charge of the floating diffusion and the reference voltage match as a digital signal corresponding to the amount of received light.

10. The solid-state imaging device according to claim 9, wherein the time code generator, the time code transfer circuit, the reference voltage generator, and the time code holding circuit are arranged on a chip different from a chip on which a pixel circuit having the floating diffusion is arranged.

11. A solid-state imaging device comprising:
a floating diffusion that accumulates charge generated by photoelectric conversion according to an amount of received light of a pixel;
a comparison circuit that compares a voltage corresponding to accumulated charge of the floating diffusion with a reference voltage;
a boosting circuit that raises a potential on a first end side of the floating diffusion during photoelectric conversion, the boosting circuit including a first transistor that controls a current flowing through the comparison circuit in such a manner that a potential on the first end side of the floating diffusion becomes high;
a current source that generates a current flowing through the comparison circuit, wherein
the first transistor controls a current generated by the current source,
the current source includes a third transistor that causes a current to flow in the comparison circuit, and
the first transistor is cascode-connected to the third transistor.

12. The solid-state imaging device according to claim 11, wherein
the comparison circuit includes a differential transistor pair that outputs a signal corresponding to a differential voltage between a voltage corresponding to the accumulated charge of the floating diffusion and the reference voltage, and
the first transistor is connected between the differential transistor pair and the third transistor.

13. The solid-state imaging device according to claim 11, wherein
the comparison circuit includes a differential transistor pair that outputs a signal corresponding to a differential voltage between a voltage corresponding to the accumulated charge of the floating diffusion and the reference voltage, and
the third transistor is connected between the differential transistor pair and the first transistor.

14. The solid-state imaging device according to claim 11, wherein the first transistor and the third transistor are shared by a plurality of pixels each having the floating diffusion.

15. The solid-state imaging device according to claim 14, wherein the first transistor and the third transistor are arranged in a chip on which a pixel circuit having the floating diffusion is arranged.

16. The solid-state imaging device according to claim 14, wherein the first transistor and the third transistor are arranged in a pixel region of one pixel among the plurality of pixels.

* * * * *